US010458707B2

(12) United States Patent
Barnett

(10) Patent No.: US 10,458,707 B2
(45) Date of Patent: Oct. 29, 2019

(54) FURNACE TUNNELS AND ASSEMBLY SYSTEM

(71) Applicant: BD ENERGY SYSTEMS, LLC, Houston, TX (US)

(72) Inventor: Daniel Joseph Barnett, Katy, TX (US)

(73) Assignee: BD Energy Systems, LLC, Houston, TX (US)

( * ) Notice: Subject to any disclaimer, the term of this patent is extended or adjusted under 35 U.S.C. 154(b) by 0 days.

(21) Appl. No.: 15/532,029

(22) PCT Filed: Sep. 27, 2016

(86) PCT No.: PCT/US2016/053876
§ 371 (c)(1),
(2) Date: May 31, 2017

(87) PCT Pub. No.: WO2017/058744
PCT Pub. Date: Apr. 6, 2017

(65) Prior Publication Data

US 2018/0216887 A1 Aug. 2, 2018

Related U.S. Application Data

(60) Provisional application No. 62/233,931, filed on Sep. 28, 2015.

(51) Int. Cl.
*F27D 1/00* (2006.01)
*F27B 1/14* (2006.01)
(Continued)

(52) U.S. Cl.
CPC ............... *F27D 1/003* (2013.01); *F23J 11/12* (2013.01); *F27B 1/14* (2013.01); *F27B 9/08* (2013.01);
(Continued)

(58) Field of Classification Search
CPC .................................. F27D 1/003; F27B 1/14
See application file for complete search history.

(56) References Cited

U.S. PATENT DOCUMENTS 2,028,326 A * 1/1936 Freyermuth ............. B01J 8/062 196/116
2,194,500 A * 3/1940 Herthel .................... B01J 8/062 122/356
(Continued)

FOREIGN PATENT DOCUMENTS

CN 101534936 9/2009
GB 197671 1/1924
(Continued)

OTHER PUBLICATIONS

WO2005018793A1—machine translation.*
(Continued)

*Primary Examiner* — Nathaniel Herzfeld
(74) *Attorney, Agent, or Firm* — Daniel N. Lundeen; Lundeen & Lundeen PLLC

(57) ABSTRACT

Flue gas entry into the tunnel(s) of a furnace is controlled by varying the flow conductivity or size of the individual or groups of openings through the entry ports. The openings can be provided either as gaps between adjacent blocks, or through bores of varying diameter, or as inserts having orifices of varying diameter and a profile matching the ports in which they are placed. Matching the flow conductivity (or cross-sectional flow area) and pressure drop through the individual ports to the desired mass flow, the flue gas flow can be distributed evenly, or as otherwise desired, into different ports, intervals, and/or regions of the tunnel.

32 Claims, 17 Drawing Sheets

(51) Int. Cl.
*F23J 11/12* (2006.01)
*F27B 9/08* (2006.01)
*F27B 9/10* (2006.01)
*F27B 9/34* (2006.01)

(52) U.S. Cl.
CPC .................. *F27B 9/10* (2013.01); *F27B 9/34* (2013.01); *F27D 2001/0073* (2013.01)

(56) References Cited

U.S. PATENT DOCUMENTS

| | | | | |
|---|---|---|---|---|
| 3,345,139 | A * | 10/1967 | Heinz | B01J 19/0013 165/141 |
| 3,655,356 | A * | 4/1972 | Javaux | C03B 18/16 110/336 |
| 3,882,826 | A | 5/1975 | Feldner | |
| 4,405,564 | A * | 9/1983 | Herbort | C01B 3/24 203/DIG. 24 |
| 4,768,578 | A | 9/1988 | Sulit | |
| 5,935,532 | A * | 8/1999 | Shida | B01J 8/008 422/198 |
| 8,439,102 | B1 * | 5/2013 | Collins, III | F28F 19/002 122/512 |
| 2006/0242914 | A1 | 11/2006 | Stephansky et al. | |
| 2007/0099141 | A1 * | 5/2007 | Joshi | B01J 8/062 431/354 |
| 2007/0234974 | A1 | 10/2007 | Tacker | |
| 2008/0169578 | A1 | 7/2008 | Crane et al. | |
| 2009/0180949 | A1 * | 7/2009 | Cui | C01B 3/384 423/651 |
| 2010/0129269 | A1 | 5/2010 | Meissner et al. | |
| 2014/0183023 | A1 | 7/2014 | Quanci et al. | |
| 2018/0313539 | A1 * | 11/2018 | Russell | E04B 2/16 |

FOREIGN PATENT DOCUMENTS

| | | | | |
|---|---|---|---|---|
| WO | WO-2005018793 A1 * | 3/2005 | | B01J 8/062 |
| WO | 2015188030 | 12/2015 | | |

OTHER PUBLICATIONS

Blasch Precision Ceramics; StaBlox Flue Gas Tunnel System; http://web.archive.org/web/20150909213448/http://www.blaschceramics.com/products/stablox-flue-gas-tunnel-system/; Sep. 9, 2015 (attached to ISR, No. 3 below).

Blasch Precision Ceramics; Blasch StaBlox: Install your next SMR Flue Gas Tunnel in less than one-third the time; https://www.youtube.com/watch?v=pgQJPCAa6WY; Jan. 25, 2016; video demonstrations at 0:35, 0:41, 1:16, 1:51, 1:54, 1:55 (attached to ISR).

PCT/US2016/053876; ISR/Written Opinion; dated Mar. 31, 2017.

EP16852380.1 Extended Search Report; dated Dec. 14, 2018.

* cited by examiner

FURNACE TUNNELS AND ASSEMBLY SYSTEM

RELATED APPLICATION

This application is a nonprovisional of and claims priority benefit of U.S. 62/233,931 filed Sep. 28, 2015.

FIELD OF THE INVENTION

The present invention relates to furnace flue gas tunnels and related methods.

BACKGROUND

Fired heaters or furnaces, herein used interchangeably, are common elements of industrial plants. With reference to the reformer furnace R illustrated in FIG. 1, a section F (or sections) typically referred to as the radiant section or firebox contains a means of oxidizing fuel to release heat and reaction products ("flue gas" or "exhaust gas"). This is commonly achieved by combustion of fuel and air using industrial burners B, and in the case of heating and/or reacting fluids, the radiant section F contains a plurality of tubes T to heat the fluids.

Furnaces include reformers, steam crackers, other reactors, and non-reactive heaters employing burners or other oxidative methods of generating heat and creating flue gas. As used herein, flue gas encompasses any combination of combustion products or effluent gas.

Whether the radiant section F is used for reacting components or merely for heating, the flue gas is gathered in a series of longitudinal tunnels 1 including opposite outside row tunnels 2 and one or more inside row tunnels 4, and passed through transition section 6 to convection section 8, which is a heat recovery section dominated by convective heat transfer where additional heat is often recovered from the flue gas.

With reference to some additional details shown in FIGS. 2 and 3, the flue gas flows into the tunnels 1 through uniformly sized openings or ports 10 spaced along the length of the tunnels, and exits from the open ends 12 into the transition section 6 and/or convection section 8, or other downstream flue gas processing equipment.

The tunnels 1 may include a pair of side walls 16 in each inside tunnel, or a side wall 18 in the case of an outside tunnel, and an outer wall 20 against the firebox wall 22 in the case of the outside row tunnels 2, which are erected from the furnace floor 24 using insulating firebricks transitioning to regular firebrick secured with mortar up to a roof or lid 26, sometimes called coffin covers, often made from large refractory slabs with large expansion gaps created at regular intervals to account for thermal expansion.

The tunnels 1 have flow channels for the flue gas which are normally of uniform width, height and cross-sectional area between the open end 12 and closed end 14. To balance the amount of flue gas entering the tunnels 1 at various points along their length, the number of openings or ports 10 per interval is decreased relative to the pressure drop through the ports 10, which due to the velocity of the flue gas in the tunnels 1, usually means that the number of holes is decreased relative to the distance of the interval from the closed end 14 of the tunnel 1, or stated another way, increased relative to the distance of the interval from the exit end 12 of the tunnel. The ports 10 are formed as the walls 16, 18 are constructed by leaving out half blocks in regular patterns. Since the outside row tunnels 2 generally receive flue gas from the outside row of burners from one side only, these tunnels are usually sized to receive only a fraction of the flue gas passing through the inside row tunnels 4, e.g., 65%. An example applying the industry standard design principles for flue gas tunnels is presented in Table 1.

TABLE 1

Example of Flue Gas Tunnel Design Principles*

| Property | Closed End | Midpoint | Open End |
|---|---|---|---|
| Inside Tunnel Velocity, m/s (ft/sec) | 0 | 15 (50) | 30 (100) |
| Total Gauge Pressure, Pa (in. w.c.) | −187 (−0.75) | −189 (−0.76) | −194 (−0.78) |
| Velocity Pressure, Pa (in. w.c.) | 0 | 72 (0.29) | 291 (1.17) |
| Static Gauge Pressure, Pa (in. w.c.) | −187 (−0.75) | −261 (−1.06) | −490 (−1.95) |
| Firebox Gauge Pressure, Pa (in. w.c.) | −150 (−0.60) | −150 (−0.60) | −150 (−0.60) |
| Differential Pressure, Pa (in. w.c.) | 37 (0.15) | 114 (0.46) | 336 (1.35) |
| Calculated Relative Opening Area (dimensionless) | 10 | 5.7 | 3.4 |
| Actual Relative Opening Area Due to Rounding to Number of Openings | 10 | 6 | 3 |

*From BD Energy Systems Steam Methane Reformer Advanced Training Course Handbook, Part 2 - Critical Design Features, Chapter 4 - Radiant Section (2015). Based on tunnels of uniform cross-sectional flow area.

From this example, it is seen that the use of uniform opening sizes only allows a rough approximation of the desired opening area in each interval. Furthermore, because of the high temperature and thermal stresses, the tunnels 1 are usually constructed with pilasters in the walls at regular intervals 28, which do not allow the placement of openings using conventional block construction techniques. The placement of ports 10 in the industry standard tunnel design thus usually results in a very uneven, fluctuating entry or mass flow rate of flue gas along the various intervals, as shown in FIG. 4. Moreover, the ports 10 are normally positioned near or upwardly from the bottom of the tunnels 1, so that there is greater flue gas flow at the bottom of the tubes T especially where they are more vulnerable to these excessive temperature fluctuations. While heating in the firebox F is dominated by radiance, the temperature fluctuations can be sufficiently substantial, especially during startup and/or shutdown, to eventually result in premature tube failure and loss of the flow of reactants through the failed tubes, which in turn further exacerbating the temperature fluctuations.

Other efforts to make the flow of flue gas into the tunnels more uniform have included angled slots in the lid of the tunnel and an increasing cross-sectional area of the tunnel to maintain a uniform velocity of flue gas in the tunnel, as described in US 2007/0234974 A1.

Additional design parameters and issues are described in BD Energy Systems Steam Methane Reformer Advanced Training Course Handbook, Part 2—Critical Design Features, Chapter 4—Radiant Section (2015), a copy of which is appended hereto and made a part hereof in its entirety.

Recently, stackable, interlocking refractory blocks made with mullite and/or alumina resistant to high temperature creep, have been made available to the industry, such as those described in US 2006/0242914 A1; or those described in J. Quntiliana et al., "Improving Flue Gas Tunnel Reliability, Nitrogen+Syngas, No. 336, p. 59 (July-August 2015), and WO 2015/188030, e.g., the STABLOX™ flue gas tunnel system commercialized by Blasch Precision Ceramics (Albany, N.Y.). The use of these tunnel systems has facilitated a more versatile location of the ports 10, as well as a more stable and quicker tunnel wall construction. Even so, optimizing the industry standard tunnel design for more precise placement of uniformly sized ports 10, still results in a significant variation in flue gas mass flow rates, e.g., as seen in the example of FIG. 5.

The industry would benefit from improved flue gas tunnel designs and operations that avoid or lessen the extent of drawbacks associated with the fluctuation of flue gas flow into and/or within the flue gas tunnels.

SUMMARY OF THE INVENTION

In one or more embodiments of the invention, the entry of the flue gas into the tunnel(s) of a furnace is controlled by providing a uniform or regular spacing of entry ports along a tunnel structure, such as a wall(s) and/or roof, and varying the flow conductivity among the entry ports. In some embodiments the flow conductivity is controlled by the size of a passage through the port, e.g., diameter, which may be provided either as through bores of varying diameter or otherwise integrally formed in the structure, or as inserts having bores of varying diameter which are placed in ports having a uniform size. In some embodiments, by matching the flow conductivity and pressure drop through the individual ports (or groups or intervals) to the desired mass flow, the flue gas can be distributed as desired to different locations or regions of the tunnel, e.g., to achieve an essentially evenly distributed mass flow into the tunnel at longitudinal intervals, such as by increasing the diameter of the passages from smallest in the interval near the open or exit end of the tunnel to largest in the interval farthest from the open end, e.g., adjacent a closed end of the tunnel, especially where the tunnel has a uniform cross-sectional area.

In an embodiment of the invention, a furnace tunnel, defining a flow channel for flue gas from a firebox to pass to an open end of the tunnel, comprises a longitudinal refractory structure separating the flow channel from the firebox, a plurality of ports formed in the refractory structure for the flue gas to enter the flow channel from the firebox, a regular spacing pattern of the ports along the length of the refractory structure, and a passage through each of the respective ports providing relatively varied flow conductivities to control flue gas entry into the flow channel.

In another embodiment, a furnace comprises a firebox, and one or more tunnels defining a flow channel for flue gas from a firebox to pass to an open end of the tunnel, and comprising a longitudinal refractory structure separating the flow channel from the firebox, a plurality of ports formed in the refractory structure for the flue gas to enter the flow channel from the firebox, a regular spacing pattern of the ports along the length of the refractory structure, and a passage through each of the respective ports providing relatively varied flow conductivities to control flue gas entry into the flow channel.

In other embodiments of the invention, a furnace tunnel assembly system comprises a plurality of interlocking refractory blocks adapted to form a longitudinal wall of a flue gas flow channel in a firebox, at least some of the blocks comprising ports formed for the flue gas to enter the flow channel from the firebox, and respective flow passages for the ports, wherein at least some of the ports comprise passages having a relatively different flow conductivity than at least some of the other passages.

In other embodiments, a method comprises stacking refractory blocks to form a longitudinal wall of a furnace tunnel, providing a uniform density of ports in successive intervals in the wall between open and closed ends of the tunnel, and providing flow passages of varying relative flow conductivity through the ports.

In other embodiments, a method comprises passing flue gas from a firebox through a longitudinal refractory structure of a tunnel, positioning passages in respective ports evenly distributed along the length of the refractory structure to admit the flue gas into a flow channel in the tunnel, and controlling relative flow rates of the flue gas through the ports by providing some of the passages with a different flow conductivity relative to the other passages, e.g., different cross-sectional areas or diameters.

In other embodiments, a flue gas tunnel comprises a longitudinal wall extending along a flow channel from a closed end of the tunnel to an open end of the tunnel; a plurality of ports of uniform profile formed in the wall for the flue gas to enter the flow channel and arranged in columns from a near column adjacent the open end to a far column adjacent the closed end and a plurality of intermediate columns between the near and far columns, wherein each of the columns has the same number of ports; a like plurality of inserts having a profile matching the respective ports and received therein; orifices formed in the respective inserts; a plurality of sets of the inserts, each set having a different orifice diameter with respect to the other sets, each set of inserts comprising orifices of uniform diameter within the set; wherein each column comprises a plurality of inserts selected from one or more of the sets of inserts, such that an overall cross-sectional flow area through the orifices of each column increases from the near column to the far column.

In other embodiments, a flue gas tunnel disposed in a fired heater comprises a floor, two side walls, a roof, and one or two open ends through which flue gas may exit, optionally through a respective transition section(s), into a respective convection section(s) which may be a common convection section or separate convection sections. At least one side all comprises a plurality of passages of varying cross-sectional areas.

In some embodiments, a plurality of any of the flue gas tunnels described herein are disposed in a steam-methane reformer firebox, the tunnels having an open end through which flue gas may exit into a common convection section or separate convection sections, or through a transition section and into the common convection section. In some embodiments, the plurality of tunnels comprises outer tunnels having one wall with the ports and/or passages formed therein, and inner tunnels between the outer tunnels, the inner tunnels having a pair of opposing side walls with the ports and/or passages formed therein.

In some embodiments, the ports in the refractory structure are equipped with directional flow diverters to promote mixing of the flue gas in the tunnel with a reactant introduced into the tunnel, e.g., a reducing agent to promote selective non-catalytic reduction of the NOx components.

DETAILED DESCRIPTION OF THE INVENTION

Figure 1:
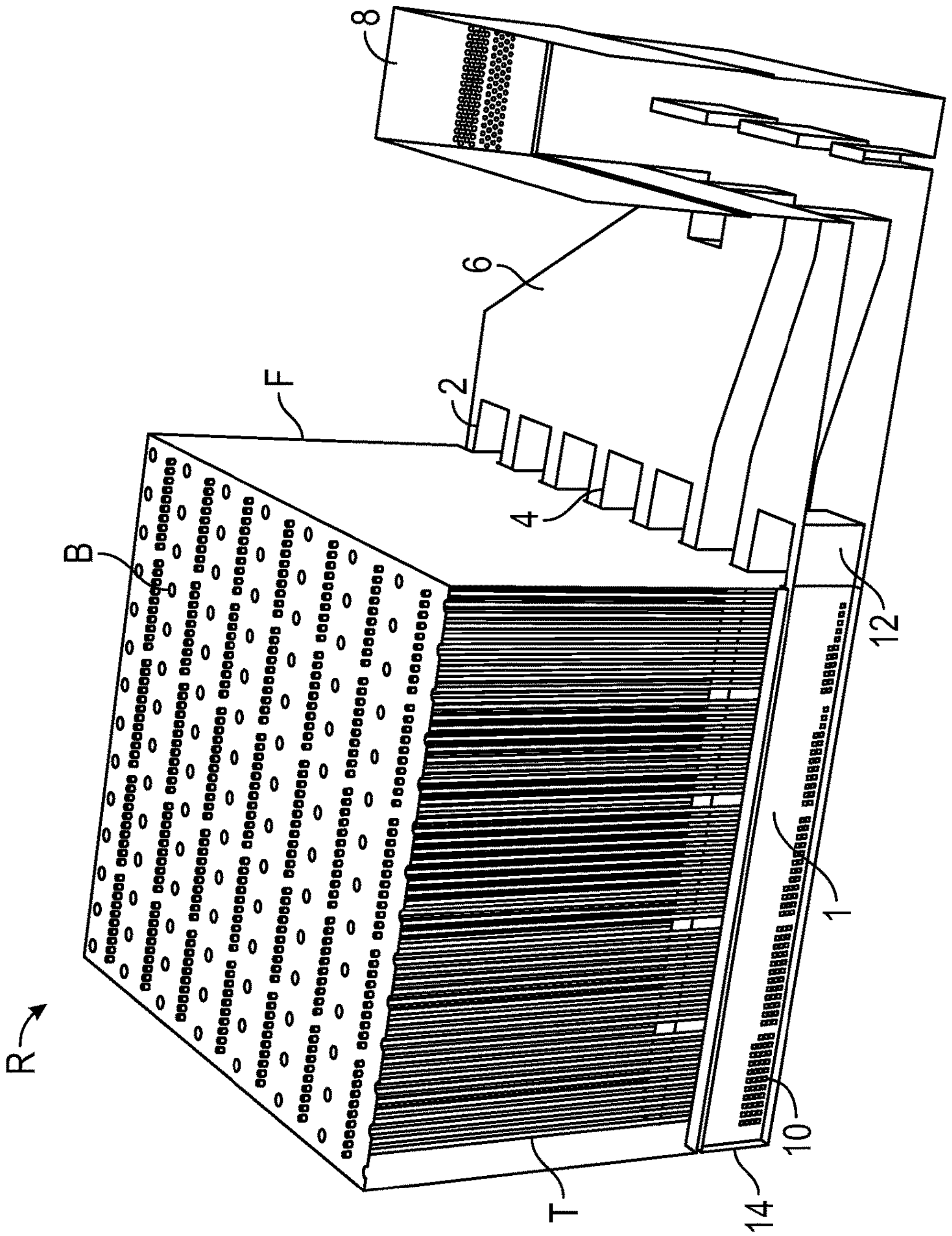
FIG. 1 (Prior Art)
FIG. 1 is a sectional perspective view showing the layout of a typical steam-methane reformer furnace.
Figure 2:
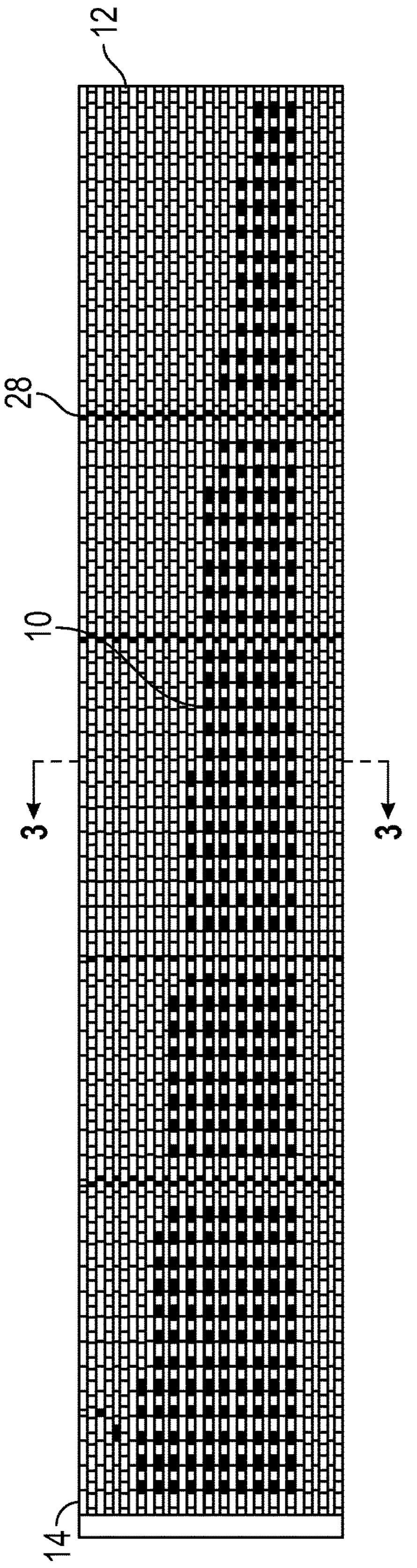
FIG. 2 (Prior Art)
FIG. 2 is a side elevation view of the typical brick construction used for a side wall of a flue gas tunnel according to the prior art.
Figure 3:
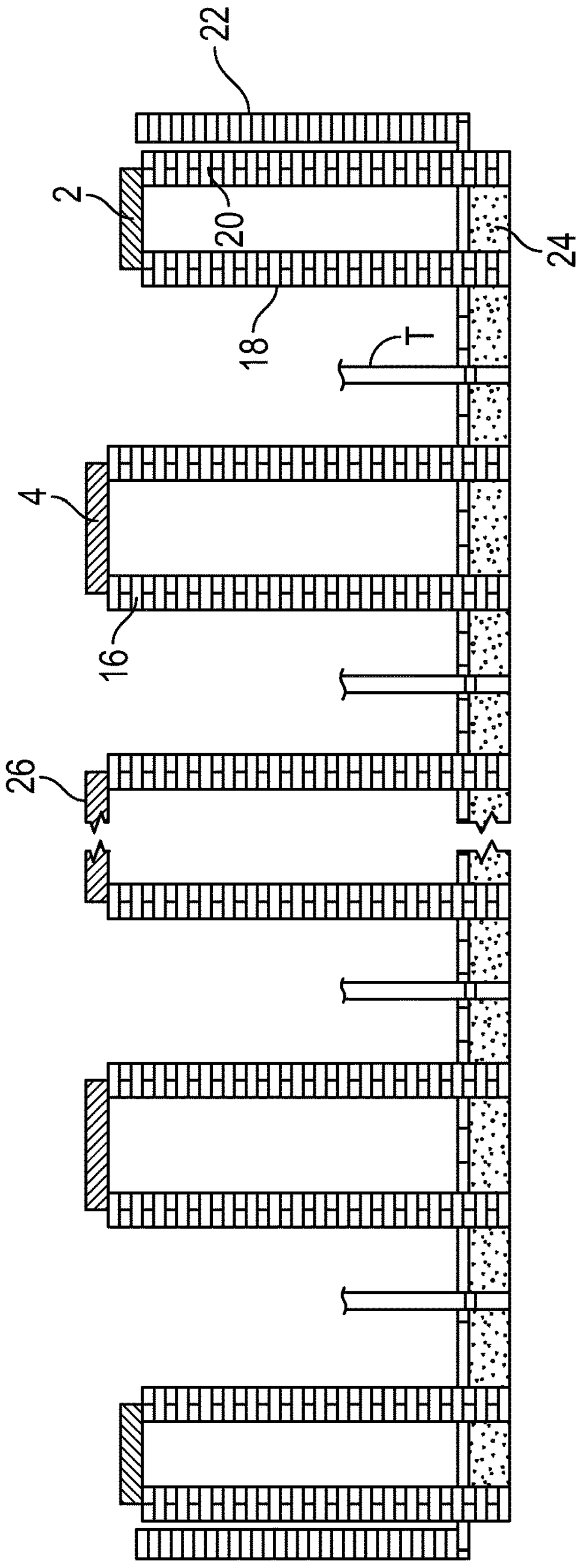
FIG. 3 (Prior Art)
FIG. 3 is an end cross-sectional elevation view of a typical tunnel section of a reformer furnace as seen along the view lines 3-3 of FIG. 2.
Figure 4:
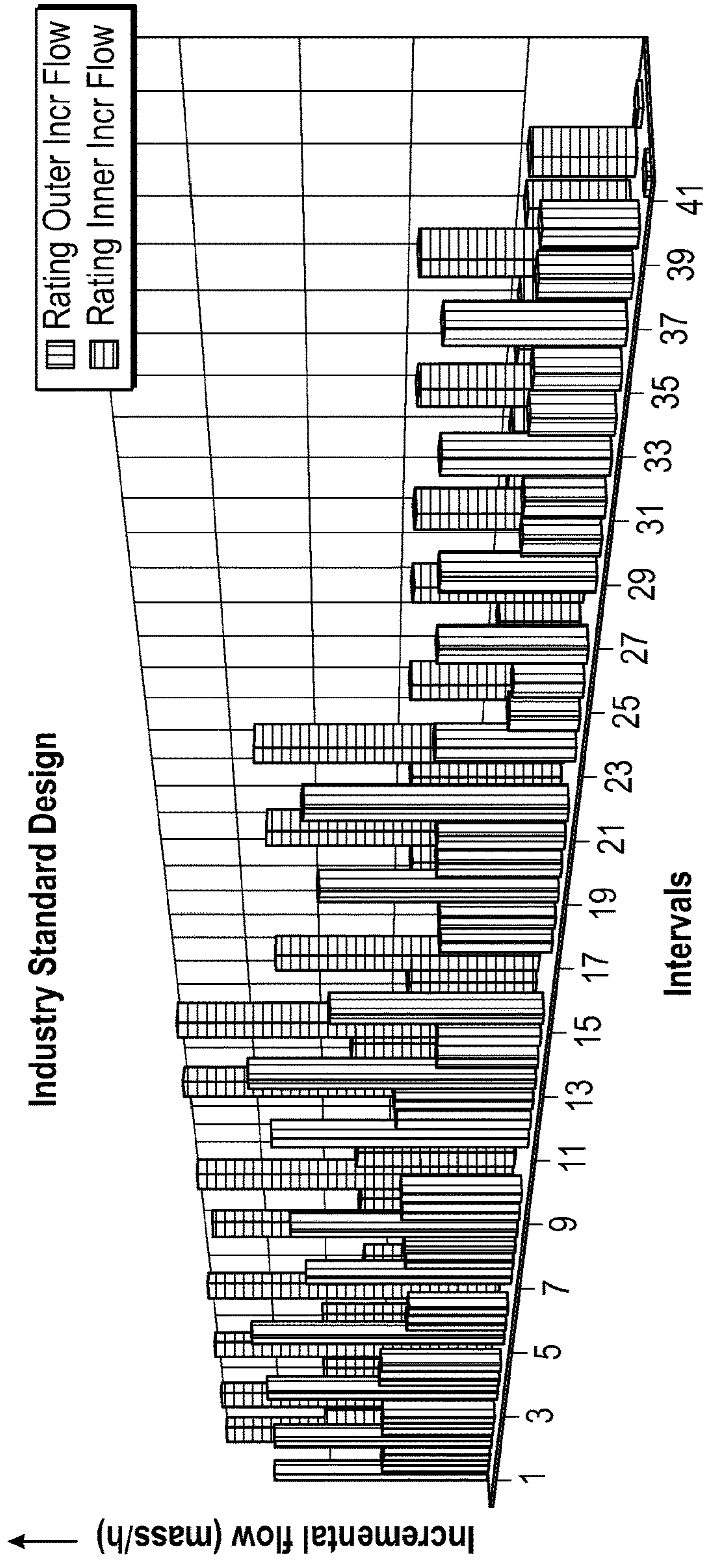
FIG. 4 (Prior Art)
FIG. 4 is a graph of the mass flow distribution along intervals of conventional tunnels employing a typical industry standard design.
Figure 5:
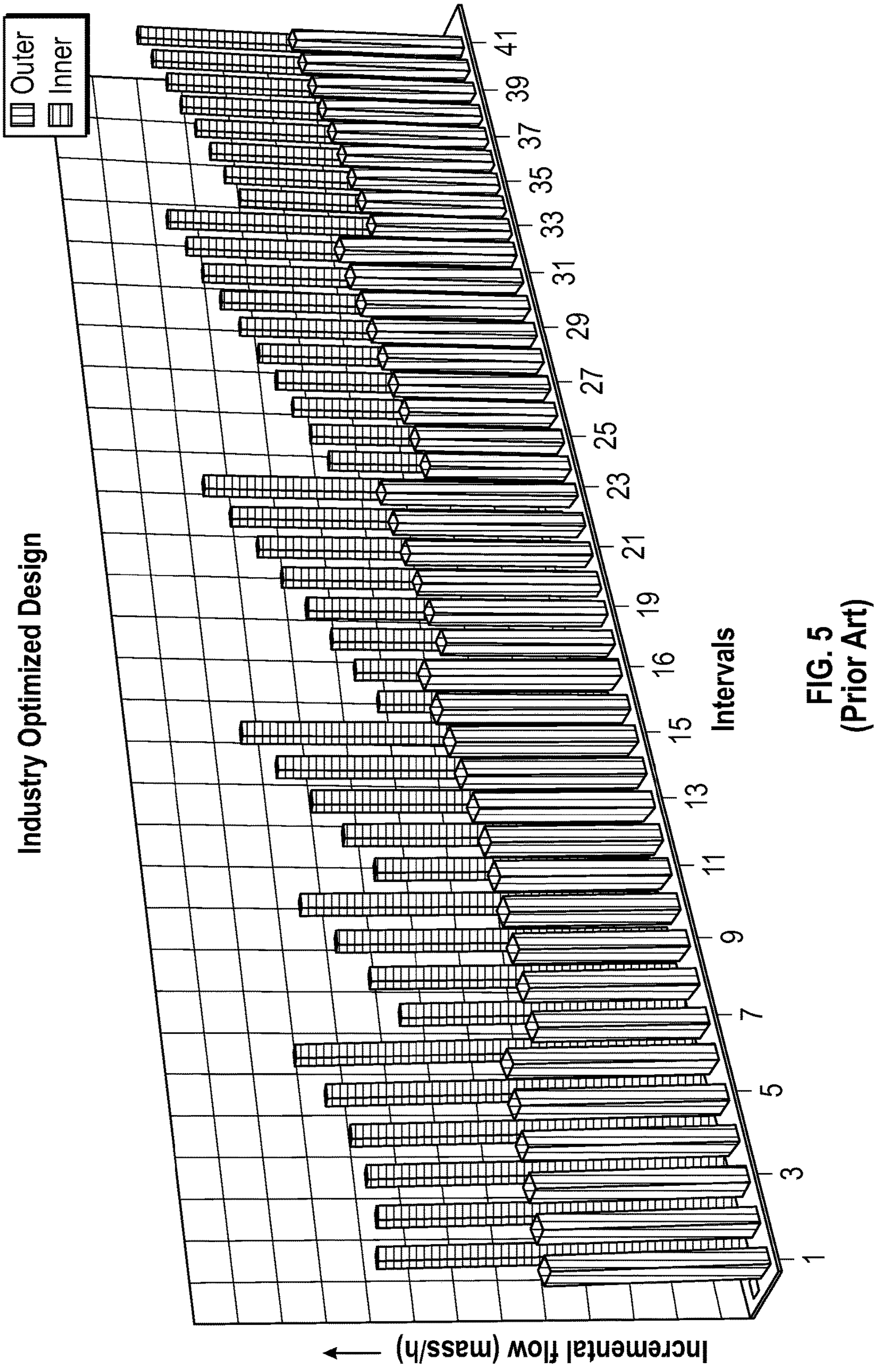
FIG. 5 (Prior Art)
FIG. 5 is a graph of the mass flow distribution along intervals of conventional tunnels employing an optimized industry standard design.

The following definitions are applicable herein:

Adapted to—made suitable for a use or purpose; modified.

Adjacent—next to or adjoining.

Block (brick)—a large solid or hollow piece of hard material, especially rock, stone, concrete, refractory, or wood, typically rectangular with flat surfaces on each side.

Channel—a passage or duct for fluid.

Columns—a vertical or upright arrangement of items.

Closed—having or forming a boundary or barrier.

Control—determine the behavior or supervise the running of.

Cross-sectional area—the extent or measurement of a surface or shape that is or would be exposed by making a straight cut through something, especially at right angles to an axis.

Diameter—a straight line passing from side to side through the center of a body or figure, especially a circle or sphere; the radius is half the diameter.

Different—not the same as another or each other; unlike in nature, form, or quality.

Disposing—putting or arranging in a particular place or way. Used synonymously with placing and positioning.

Dividing—physically or, for the purposes of design, conceptually separating into parts.

Each—used to refer to every one of two or more things, regarded and identified separately.

Embodiments—non-limiting tangible or visible forms of an idea or quality according to the present disclosure or invention.

End—the furthest or most extreme part or point of something.

Enter—come or go into.

Entry—the act of going or coming in.

Far—at, to, or by a great distance (used to indicate the extent to which one thing is distant from another).

Firebox—the chamber of a furnace or boiler in which fuel is burned.

Floor—the lower inside surface of a hollow structure.

Flow—to issue or move in a stream.

Flow conductivity—a measure of how easily a given fluid moves through a channel, passage or orifice at a given pressure drop; the inverse of flow resistivity; the value of K in the equation $Q/A=-K*(dp/dx)$ where Q/A is the superficial or Darcy's velocity (where Q is the volumetric flowrate of the fluid and A is the geometric cross-sectional area of the flow passage or medium), and dp/dx is the pressure change per unit length of the flow passage. For circular orifices the flow conductivity is proportional to the cross-sectional flow area or diameter squared. If the relative flow conductivity of two passages is different depending on the fluid properties and/or flow conditions, the relative flow conductivities are determined using the fluid and conditions actually present, or if the fluid and conditions are not specified, using a flue gas comprised of 1.7 mol % $O_2$, 7.8 mol % $CO_2$, 20 mol % $H_2O$, and 70.5 mol % $N_2$ at entry conditions of 101.2 kPa and 1050° C. (1904° F.), and a pressure drop of 100 Pa (0.4 in. water).

Flue gas—the mixture of gases resulting from combustion and other reactions in a furnace.

Furnace—a structure or apparatus in which heat may be generated at very high temperatures.

Hydraulic diameter—$D_H=4A/P$, where $D_H$ is the hydraulic diameter, A is the cross sectional area and P is the wetted perimeter of a channel, duct, or passage.

Essentially imperforate—having no significant openings or apertures.

Insert—a thing that is placed or fit into another thing.

Interlocking—engaging with each other by overlapping or by fitting together projections and recesses.

Intermediate—coming between two things in time, place, order, character, etc.

Interval—a space between two objects, points or units.

Length—measurement or extent of something along its greatest dimension.

Longitudinal—running or along the length of a body; pertaining or extending along the long axis of a body.

Near—located a short distance away.

Open—allowing access, passage, or a view through an empty space; not closed or blocked up.

Pass—move or cause to move in a specified direction.

Passage—a path, channel, or duct through, over, or along which something may pass.

Plate—a thin, flat sheet or strip of metal or other material, typically one used to join or strengthen things or forming part of a machine; a panel.

Plurality—two or more.

Port—an aperture or opening.

Refractory—a substance or material that is resistant to heat.

Regular—arranged in or constituting a constant or definite pattern, especially with the same space between individual instances.

Respective—belonging or relating separately to each of two or more people or things.

Roof or lid—a structure forming an upper cover.

Rows—a number of things in a more or less straight line

Separate—divide or cause to divide into constituent or distinct elements.

Set—a group or collection of similar things.

Size—the relative extent of something.

Spacing—the arranging of the distance between things.

Spacing pattern—a regular arrangement of the distance between things.

Square pattern—a pattern in which joining the centers of four adjacent items forms a square.

Structure—a building or other object constructed from several parts.

Successive—following one another or following others.

Through—moving or lying in one side and out the other.

Triangular pattern—a pattern in which joining the centers of three adjacent items forms an oblique triangle (without a right angle).

Tunnel—a covered passageway, e.g., a structure physically defining a flow channel for flue gas to exit from a furnace.

Uniform—of the same form, manner, degree or character.

Upright—vertical or erect.

Varied—incorporating a number of different types or elements; showing variation or variety.

Wall—a structure enclosing or shutting off a space.

In some embodiments of the invention, a furnace tunnel defines a flow channel for flue gas from a firebox to pass to an open end of the tunnel, e.g., a tunnel having a constant or uniform cross-sectional flow area. In some embodiments, the tunnel comprises a longitudinal refractory structure separating the flow channel from the firebox, a plurality of ports formed in the refractory structure for the flue gas to enter the flow channel from the firebox, a regular spacing pattern of the ports along the length of the refractory structure, and a passage through each of the respective ports providing relatively varied flow conductivities to control flue gas entry into the flow channel.

In some embodiments, the refractory structure comprises at least one upright wall and a roof, e.g., with the ports in the wall(s) and an essentially imperforate roof. In some embodiments, the flow channel can have an essentially uniform cross-sectional flow area.

In some embodiments, the refractory structure comprises blocks, e.g., interlocking and/or stackable blocks. In some embodiments, the ports are integrally formed in the blocks, e.g., by casting or boring, and perforated inserts are received in the ports. In some embodiments, the perforations, e.g., orifices, define cross-sectional flow areas through the respective passages. In some embodiments, the ports have a uniform profile and/or the inserts have a profile matching the respective ports. In some embodiments, the perforations in some of the inserts have a cross-sectional flow area that is greater with respect to the perforations of some of the other inserts. In some embodiments, the perforated inserts comprise sets of a plurality of the inserts, wherein the perforations within each set of inserts have a uniform cross-sectional flow area that differs with respect to the other one or more sets of inserts.

In some embodiments, the ports are disposed in a plurality of intervals comprising a near interval adjacent to the open end, a far interval spaced away from the open end, e.g., adjacent to a closed end of the tunnel, and a plurality of intermediate intervals between the near and far intervals. In some embodiments, the passages through the ports provide the far interval with an overall flue gas flow conductivity relatively greater than the overall flue gas flow conductivity of the near interval. In some embodiments, the overall flue gas flow conductivities of the respective intermediate intervals increase successively from the near interval to the far interval. In some embodiments, the passages through the ports provide the far interval with an overall cross sectional flow area greater than the overall cross sectional flow area of the near interval, and/or the overall cross sectional flow area of the respective intermediate intervals increase successively from the near interval to the far interval.

In some embodiments, each of the near, far and intermediate intervals have the same number of ports. In some embodiments, the ports have a uniform profile and receive perforated inserts having a matching profile. In some embodiments, the perforated inserts comprise one or more sets of the inserts having a uniform perforation diameter. In some embodiments, the far interval has an overall cross sectional flow area greater than the overall cross sectional flow area of the near interval, and/or the overall cross sectional flow area of the respective intermediate intervals increases successively from the near interval to the far interval. In some embodiments, the inserts in each interval comprise inserts from a single set of inserts or from a plurality of different sets.

In some embodiments according to the present invention, a flue gas tunnel comprises a longitudinal wall extending along a flow channel from a closed end of the tunnel to an open end of the tunnel; a plurality of ports of uniform profile formed in the wall for the flue gas to enter the flow channel, and arranged in columns from a near column adjacent the open end to a far column adjacent the closed end and a plurality of intermediate columns between the near and far columns, wherein each of the columns has the same number of ports; a like plurality of inserts having a profile matching the respective ports and received therein; orifices formed in the respective inserts; a plurality of sets of the inserts, each set having a different orifice diameter with respect to the other sets, each set of inserts comprising orifices of uniform diameter within the set; wherein each column comprises a plurality of inserts selected from one or more of the sets of inserts, such that an overall cross-sectional flow area through the orifices of each column increases from the near column to the far column.

In some embodiments, the wall comprises interlocking blocks, the ports are arranged in regular rows and columns, and/or the ports are arranged in a triangular pattern or a square pattern. In some embodiments, the tunnel further comprises single ones of the inserts having a different orifice diameter than the sets of the inserts in the ports of one or more of the columns.

In some embodiments of the invention, a furnace tunnel defines a flow channel for flue gas from a firebox to pass to an open end of the tunnel, and comprises a longitudinal refractory structure separating the flow channel from the firebox, a plurality of ports formed in the refractory structure for the flue gas to enter the flow channel from the firebox, a regular spacing pattern of the ports along the refractory structure, and respective passages through the ports having a varied flow conductivity to control flue gas entry into the flow channel.

In some embodiments according to the present invention, a furnace comprises a firebox and the furnace tunnel of any one or combination of embodiments described herein.

In some embodiments according to the present invention, a furnace tunnel assembly system comprises a plurality of interlocking refractory blocks adapted to form a longitudinal wall of a flue gas flow channel in a firebox. In some embodiments, at least some of the blocks comprise ports formed for the flue gas to enter the flow channel from the firebox, and there are respective flow passages for the ports. In some embodiments, at least some of the ports comprise passages having a relatively different flow conductivity than at least some of the other passages.

In some embodiments of the assembly system, the flow passages comprise openings defined by the profiles of the respective ports, e.g., bores through the blocks, and the different flow conductivities correspond to different cross-sectional areas of the openings, e.g., diameters of the bores.

In some embodiments of the assembly system, the flow passages comprise one or more perforations or orifices formed in respective inserts receivable in the ports, e.g., where the different flow conductivities correspond to different cross-sectional areas of the perforations and/or diameters of the orifices.

In some embodiments, the assembly system comprises a plurality of sets of the port openings or inserts having different perforation or orifice sizes, from which the appropriate or most nearly appropriate size can be selected for a particular port location, or combination of sizes for the ports in a particular interval. For example, the system can comprise a plurality of sets of the inserts, wherein the inserts within each set have respective orifices of the same size, and wherein each set has different orifice sizes than the other sets. In this manner the port openings (e.g., in prefabricated blocks) or inserts can be manufactured in an array of different sizes, an inventory thereof transported to the assembly site, and the appropriate size selected from the inventory for a particular port location. In one non-limiting example, the inventory of port openings and/or inserts can have "standard" sizes to facilitate assembly, e.g., a smallest diameter of from 12.7 mm (0.5 in.) to 19.1 mm (0.75 in.), incremented by 3.17 mm (0.125 in.) up to 31.8 (1.25 in.) to 44.4 mm (1.75 in.), and then incremented by 6.35 mm (0.25 in.) up to a largest diameter of from 63.5 mm (2.5 in.) or 76.2 mm (3 in.). In this manner the wall may be constructed with standard size blocks and/or inserts, selecting the ones with the appropriate opening sizes for the location or interval of the wall.

In some embodiments, the assembly system comprises a kit or essentially complete inventory of component parts for the furnace tunnel assembly, and/or a plurality of the component parts partially pre-assembled into one or more modules.

In some embodiments according to the present invention, a method comprises assembling a furnace tunnel from the blocks and/or inserts of any one or combination of embodiments of the furnace tunnel assembly system described herein.

In some embodiments according to the present invention, a method comprises stacking refractory blocks to form a longitudinal wall of a furnace tunnel, providing a uniform density of ports in successive intervals in the wall between open and closed ends of the tunnel, and providing flow passages of varying relative flow conductivity through the respective ports. In some embodiments, the method further comprises placing perforated inserts in the ports, wherein the flow passages comprise one or more orifices formed in respective inserts which are adapted to be received in the ports, and or wherein the different flow conductivities correspond to different diameters of the orifices. In some embodiments, the method further comprises varying cross-sectional areas of the passages to regulate entry of flue gas from a firebox into the tunnel, e.g., such that a mass flow of the flue gas from the firebox is uniformly distributed through each interval.

In some embodiments according to the present invention, a method comprises passing flue gas from a firebox through a longitudinal refractory structure of a tunnel, positioning passages in respective ports evenly distributed along the length of the refractory structure to admit the flue gas into a flow channel in the tunnel, and controlling relative flow rates of the flue gas through the ports by providing some of the passages with a different flow conductivity relative to the other passages.

In some embodiments, the method further comprises dividing (for design purposes) the length of the refractory structure into a plurality of regular intervals having the same number of ports, wherein the overall flow conductivity of some of the intervals is different relative to the other intervals, e.g., wherein the overall flow conductivity of successive intervals increases from a near interval adjacent to an open end of the tunnel to a far interval adjacent a closed end of the tunnel. In some embodiments, the method alternatively or additionally comprises evenly distributing a mass flow rate of the flue gas entering the tunnel among the intervals, e.g., such that the mass flow rate of the flue gas through each interval is no more than 2% greater or less than an overall average of the mass flow rate through the intervals.

In some embodiments, the method further comprises placing inserts in respective ports, the inserts comprising the respective passages. In some embodiments, the inserts and ports have matching profiles. In some embodiments the inserts comprise sets of perforated inserts, wherein the perforations within each set of inserts have a uniform cross-sectional flow area, e.g., diameter, that differs with respect to the other one or more sets of inserts.

In some embodiments, the method further comprises dividing (for design purposes) the length of the refractory structure into a plurality of regular intervals having the same number of ports, wherein the intervals comprise a near interval adjacent to an open end of the tunnel, a far interval spaced away from the open end, and a plurality of intermediate intervals between the near and far intervals, wherein the perforations in the inserts provide the far interval with an overall cross sectional flow area relatively greater than the overall cross sectional flow area of the near interval, and wherein the overall cross sectional flow area of the respective intermediate intervals increase successively from the near interval to the far interval. In some embodiments, the inserts in each interval comprise inserts from a single set of inserts or from a plurality of different sets.

Figure 6:
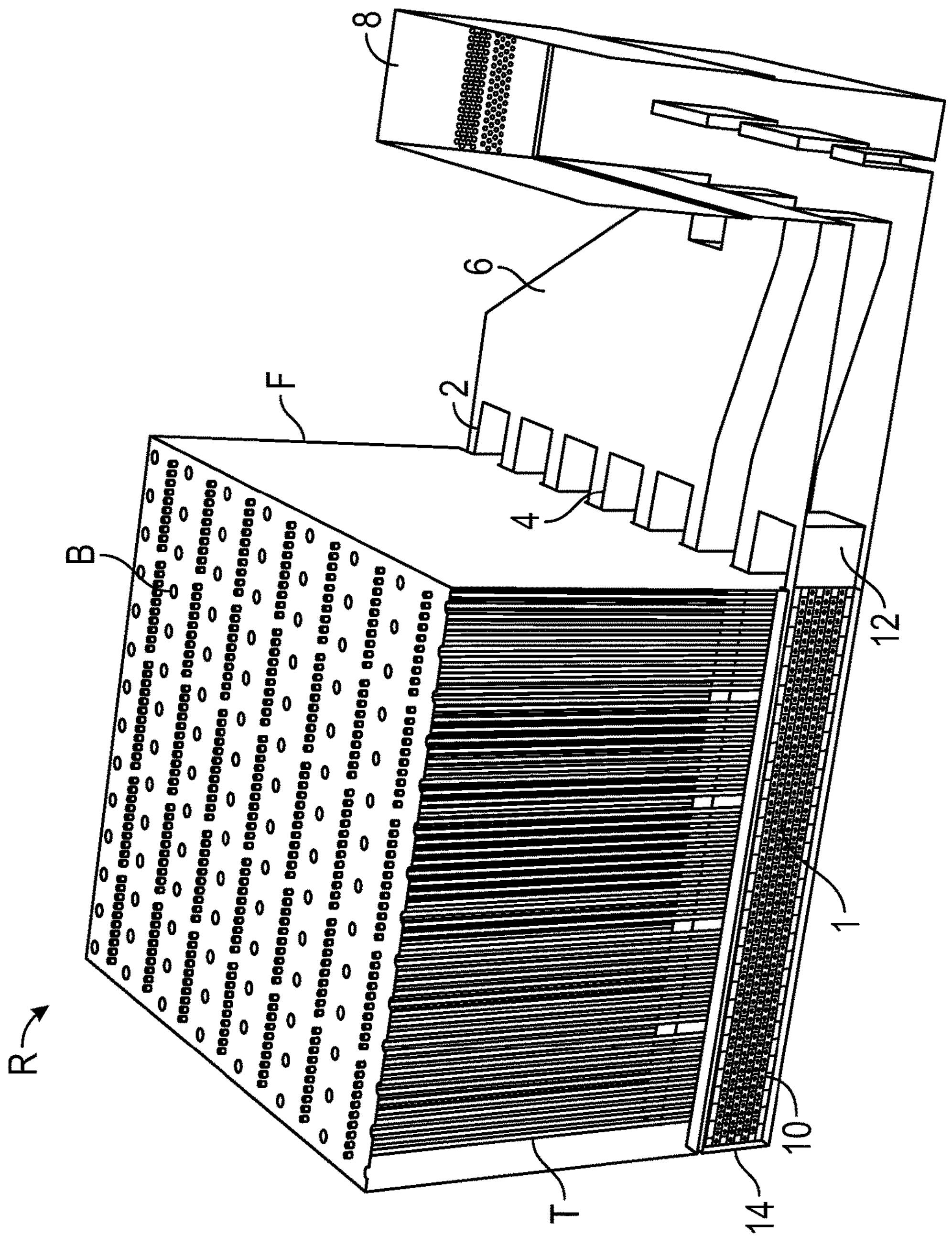
FIG. 6 is sectional perspective view showing the layout of a steam methane reformer furnace according to some embodiments of the present invention.
Figure 7:
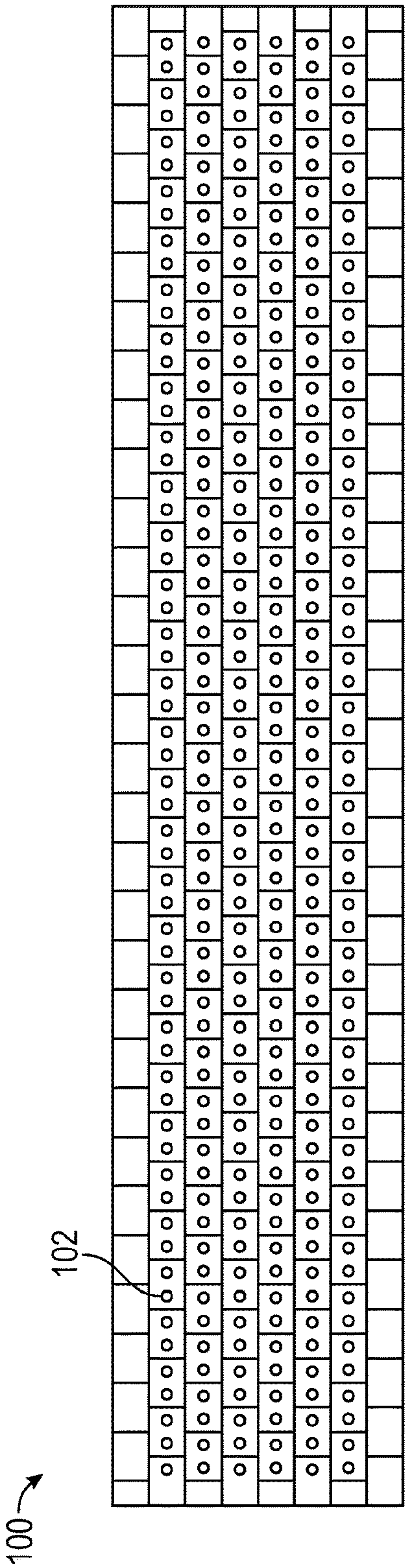
FIG. 7 is a side elevation view of a ported side wall of a flue gas tunnel according to some embodiments.

With reference to FIGS. 6 and 7, an example of a longitudinal refractory structure takes the form of an upright or vertical wall 100 disposed between the flow channel and the firebox. A plurality of ports 102 are formed in the refractory structure 100 for the flue gas to enter the flow channel from the firebox, for example, using a regular spacing pattern of the ports 102, e.g., in regularly spaced rows and/or columns. To control flue gas entry into the flow channel, passages through the ports 102 may have individually selected flow conductivity, or groups of the ports 102, e.g., by longitudinal interval, may have a selected overall flow conductivity that varies from interval to interval depending on the anticipated pressure drop to obtain the desired flow rate, as described below in more detail. In the following discussion, flow conductivity is varied by a varying cross-sectional area or diameter as one example for the purpose of clarity and illustration, however, other embodiments for varying flow conductivity such as the length, tortuosity, permeability, etc., of the flow passages, are also applicable to and useful in some embodiments of the invention.

Figure 8:
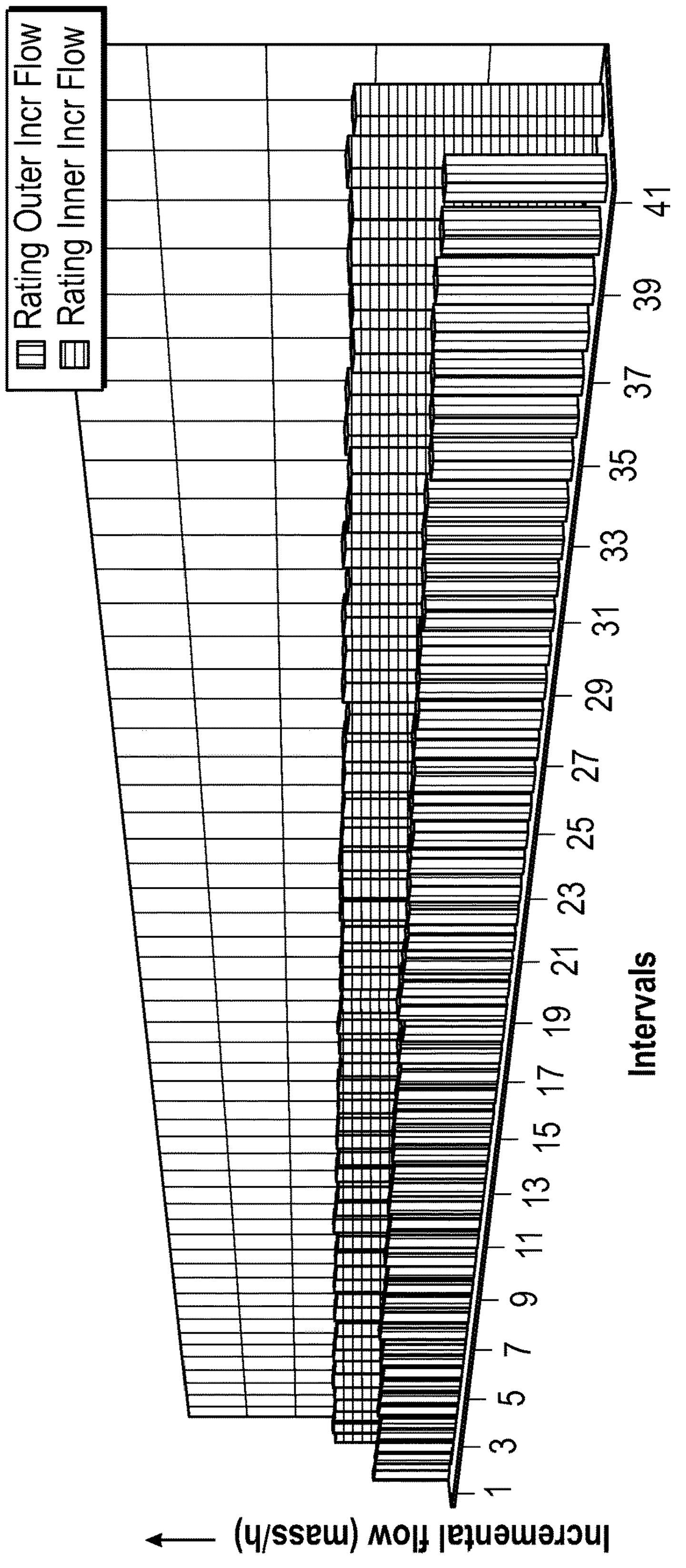
FIG. 8 is a graph of the mass flow distribution along intervals of ported tunnels according to some embodiments of the present invention.

By providing the ports 102 in a regular spacing pattern as shown in FIGS. 6-7, and varying the diameter of the through passages, the flow rate of the flue gas through each port 102 can be individually controlled for a given pressure drop and/or other conditions, e.g., to allow more or less flue gas to pass through each port 102 as desired, and/or to allow about the same amount of flue gas to enter through each port 102 or through each interval of the ports 102 where an even or balanced passage of flue gas into the tunnel wall 100 and the pressure differential may vary. In one exemplary embodiment as shown in FIG. 8, an even or balanced incremental mass flow of flue gas is achieved in each longitudinal interval along the extent each of the walls 100, e.g., such that the mass flow rate of the flue gas through each interval is no more than 2% greater or less than an overall average of the mass flow rate through the intervals, or no more than 1.5% greater or less than an overall average of the mass flow rate through the intervals, or no more than 1% greater or less than an overall average of the mass flow rate through the intervals.

Figure 9:
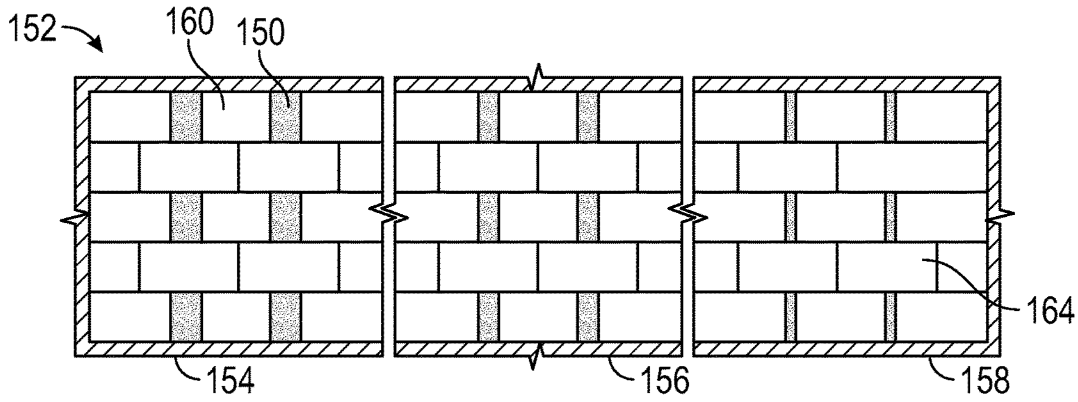
FIG. 9 is a side view of a portion of a ported tunnel wall having flow passages formed between blocks according to some embodiments of the present invention.

FIG. 9 shows an arrangement of ports 150 in portions of the wall 152 at the 3-column, 3-row near interval 158 adjacent an open (exit) end of the tunnel, a similar intermediate interval 156, and a similar far interval 154 adjacent a closed end of the tunnel. In these embodiments, the ports 150 are made using relatively short blocks 160 and leaving out fractional blocks in regular patterns to form the flow passages between adjacent blocks. The short blocks 160 are arranged in alternate rows with the full blocks 164, wherein the short blocks 160 preferably overlap or straddle the ends of the full blocks 164 in the adjacent rows above and below. The short blocks 160 are arranged in size such that the spacing (width of the ports 150) between them increases from a smallest width in the near interval 158, to a larger width in intermediate interval 156, and to a largest width in interval 154. In embodiments, the blocks 160, 164 may be conventional solid blocks, or may be hollow blocks, with or without tabs 730 and recesses 732 (see FIGS. 15C-15D) for interlocking.

Figure 10:
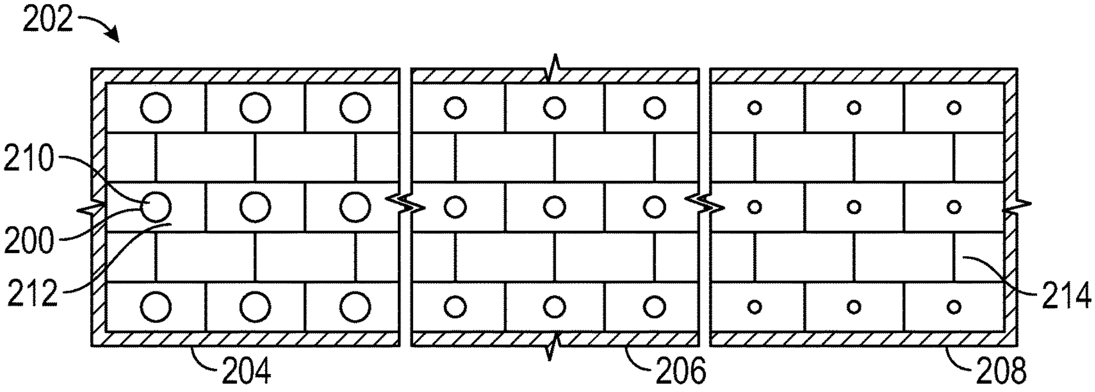
FIG. 10 is a side view of a portion of a ported tunnel wall having integral flow passages according to some embodiments of the present invention.

FIG. 10 shows an arrangement of ports 200 in portions of the wall 202 at the 3-column, 3-row near interval 208 adjacent an open (exit) end of the tunnel, a similar intermediate interval 206, and a similar far interval 204 adjacent a closed end of the tunnel. In these embodiments, the ports 200 comprise through openings 210 having a generally circular profile which comprise the flow passages formed in a central region of the blocks 212, whereas the blocks 214 are imperforate. The blocks 212 with the flow passages 210 are arranged in alternate rows with the imperforate blocks 214. The openings 210 are arranged in size such that the diameters increase from a smallest diameter in the near interval 208, to a larger diameter in intermediate interval 206, and to a largest diameter in interval 204. The openings 210 can be formed in the blocks 212 before (predrilled or precast, e.g.), during, or after construction of the wall 202.

Figure 11:
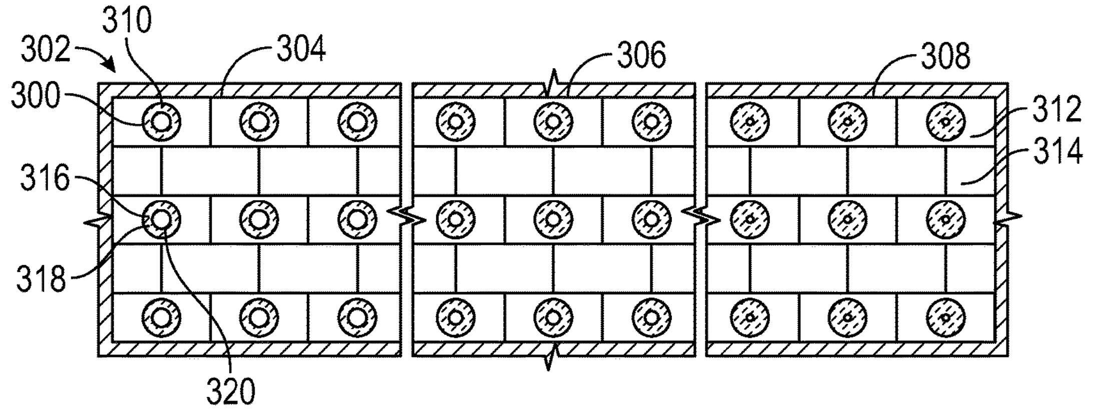
FIG. 11 is a side view of a portion of a ported tunnel wall having flow passage inserts according to some embodiments of the present invention.

In the embodiments of FIG. 11, correspondence of the last two digits in the reference numerals indicates like correspondence with the parts or components shown in FIG. 10. FIG. 11 shows an arrangement of ports 300 in portions of the wall 302 at the 3-column, 3-row near interval 308 adjacent an open (exit) end of the tunnel, a similar intermediate interval 306, and a similar far interval 304 adjacent a closed end of the tunnel. In these embodiments, the ports 300 comprise circular openings 310 formed in a central region of the blocks 312, and the blocks 314 are imperforate, as in FIG. 10.

The openings 310 in these embodiments, however, are of a uniform size or diameter or profile, whereas inserts 316 have a generally planar portion or plate 318 with a matching outside diameter or other profile for receipt in the ports 300, and variably sized flow passages 320 are formed as circular orifices in each of the inserts 316. The inserts can be made from a heat-resistant material such as a refractory ceramic, for example, alumina, mullite, or a combination thereof, and can be secured in the ports 300 by means of a matching and optionally interlocking profile and/or with refractory mortar or cement. The orifices 320 are arranged in size such that the diameters increase from a smallest diameter in the near interval 308, to a larger diameter in intermediate interval 306, and to a largest diameter in interval 304. These embodiments allow the same blocks 312, 314 to be used to facilitate constructing the wall 302 without concern for the proper placement of the blocks 312, which all have the same size ports 300, whereas the inserts 316 are preferably prefabricated, e.g., predrilled or precast, with the desired size(s) of orifices 320, for placement in the ports 300 before, or preferably during or after the construction of the wall 302.

In some embodiments, the inserts 316 are provided in sets of standard sizes of the orifices 320, e.g., a smallest diameter of 12.7 mm (0.5 in.) or 19.1 mm (0.75 in.) incremented by 3.17 mm (0.125 in.) up to 31.8 (1.25 in.)—44.4 mm (1.75 in.), and then incremented by 6.35 mm (0.25 in.) up to a largest diameter of 63.5 mm (2.5 in.) or 76.2 mm (3 in.). For example, in some embodiments, the inserts 316 may have the following standard diameters for the passage 320:

TABLE 2

Exemplary Orifice Sizes for Inserts

| 3.17 mm (0.125 in.) Incremented Orifice Sizes | 6.35 mm (0.25 in.) Incremented Orifice sizes |
|---|---|
| 19.1 mm (0.75 in.) | 38.1 mm (1.5 in.) |
| 25.4 mm (1 in.) | 44.4 mm (1.75 in.) |

TABLE 2-continued

| Exemplary Orifice Sizes for Inserts | |
|---|---|
| 3.17 mm (0.125 in.) Incremented Orifice Sizes | 6.35 mm (0.25 in.) Incremented Orifice sizes |
| 28.6 mm (1.125 in.) | 50.8 mm (2 in.) |
| 31.8 mm (1.25 in.) | 57.2 mm (2.25 in.) |
| 34.9 mm (1.375 in.) | 63.5 mm (2.5 in.) |
| 38.1 mm (1.5 in.) | 69.8 mm (2.75 in.) |

Figure 12:
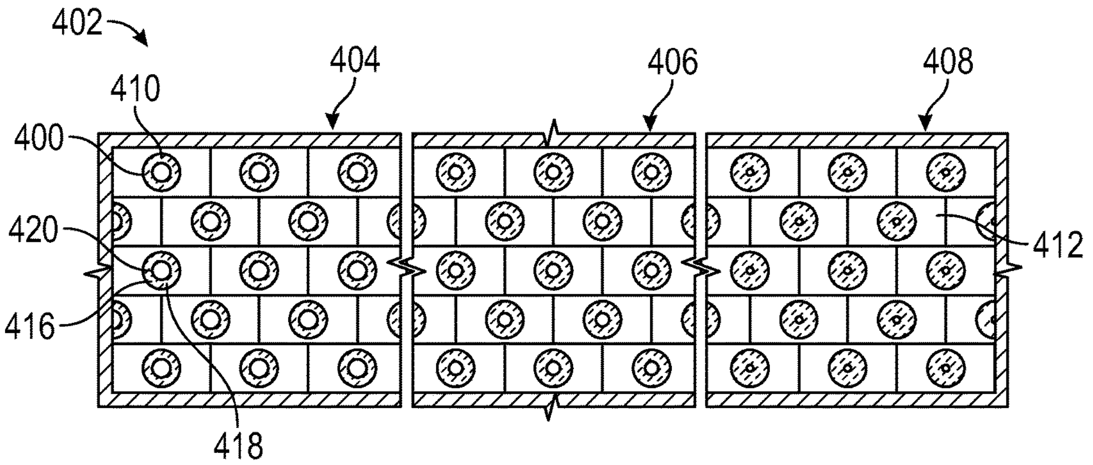
FIG. 12 is a side view of a portion of a ported tunnel wall having flow passage inserts according to some other embodiments of the present invention.

In the embodiments of FIG. 12, correspondence of the last two digits in the reference numerals indicates like correspondence with the parts or components shown in FIG. 11. FIG. 12 shows an arrangement of ports 400 in portions of the wall 402 at the near interval 408 adjacent an open (exit) end of the tunnel, an intermediate interval 406, and a far interval 404 adjacent a closed end of the tunnel. As in FIG. 11, the ports 400 comprise circular profiles 410 formed in a central region of the blocks 412, but all the blocks 412 are formed with the ports 400 (no imperforate blocks or rows). As in FIG. 11, the profiles 410 are of a uniform size or diameter, inserts 416 have a plate 418 with a matching outside diameter or other profile for receipt in the ports 400, and variably sized orifices 420 arranged in size such that the diameters increase from a smallest diameter in the near interval 408, to a larger diameter in intermediate interval 406, and to a largest diameter in interval 404. The inserts 416 can have a range of "standard sizes" for the orifices 420 as in Table 2, e.g., provided as an inventory of sets of inserts of each standard size.

Figure 13:
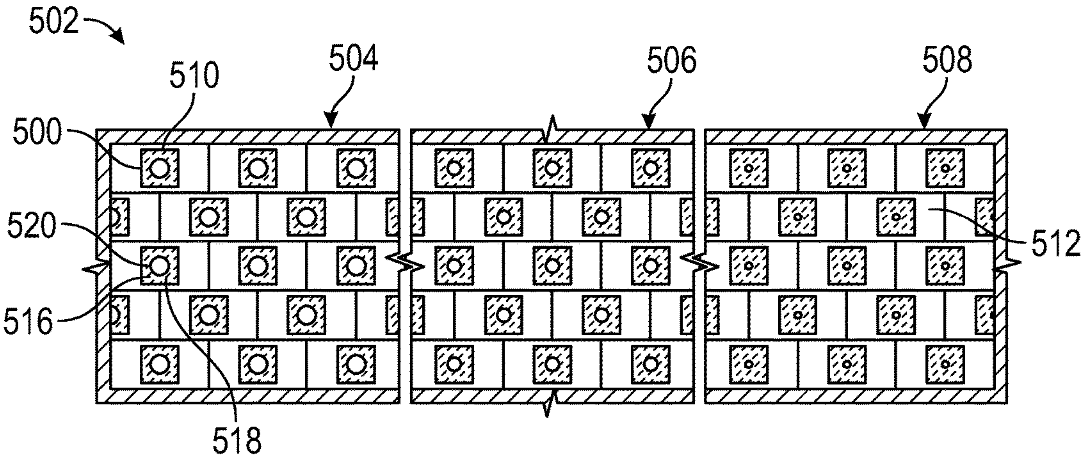
FIG. 13 is a side view of a portion of a ported tunnel wall having flow passage inserts according to some other embodiments of the present invention.

In the embodiments of FIG. 13, correspondence of the last two digits in the reference numerals indicates like correspondence with the parts or components shown in FIG. 12. FIG. 13 shows an arrangement of non-circular ports 500, e.g., a rectangular or square profile, in portions of the wall 502 at the near interval 508 adjacent an open (exit) end of the tunnel, an intermediate interval 506, and a far interval 504 adjacent a closed end of the tunnel. The square or rectangular ports 500 are formed in a central region of the blocks 512. As in FIG. 12, the ports 500 are of a uniform size, inserts 516 have a plate 518 with a matching profile for receipt in the ports 500, and variably sized orifices 520 arranged in size such that the diameters increase from a smallest diameter in the near interval 508, to a larger diameter in intermediate interval 506, and to a largest diameter in interval 504. The inserts 516 can have a range of standard sizes for the orifices 520 as in the example of Table 2.

Figure 14:
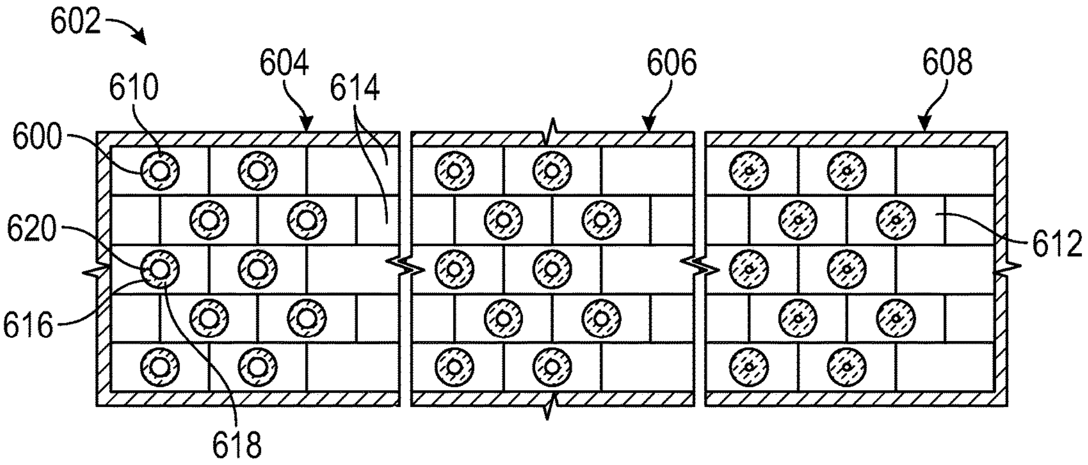
FIG. 14 is a side view of a portion of a ported tunnel wall having flow passage inserts according to some other embodiments of the present invention.

In the embodiments of FIG. 14, correspondence of the last two digits in the reference numerals indicates like correspondence with the parts or components shown in FIG. 11. FIG. 14 shows an arrangement of ports 600 in portions of the wall 602 at the near interval 608 adjacent an open (exit) end of the tunnel, an intermediate interval 606, and a far interval 604 adjacent a closed end of the tunnel. As in FIG. 11, the ports 600 comprise circular profiles 610 formed in a central region of the blocks 612, but in each row every third block 614 is imperforate in an offset pattern. As in FIG. 11, the profiles 610 are of a uniform size or diameter, inserts 616 have a plate 618 with a matching outside diameter or other profile for receipt in the ports 600, and variably sized orifices 620 arranged in size such that the diameters increase from a smallest diameter in the near interval 608, to a larger diameter in intermediate interval 606, and to a largest diameter in interval 604. The inserts 616 can again have a range of standard sizes for the orifices 620 as in the example of Table 2.

Figure 15A:
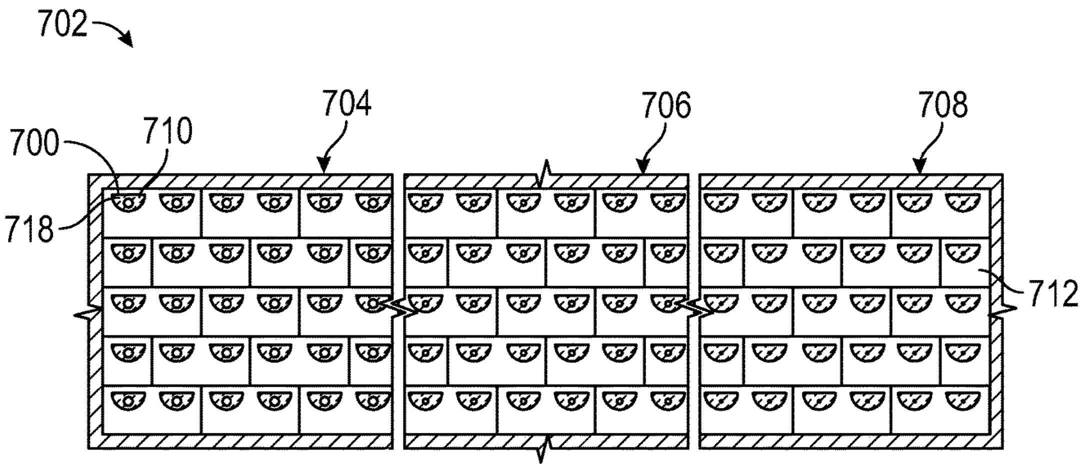
FIG. 15A is a side view of a portion of a ported tunnel wall having flow passage inserts according to some other embodiments of the present invention.
Figure 15B:
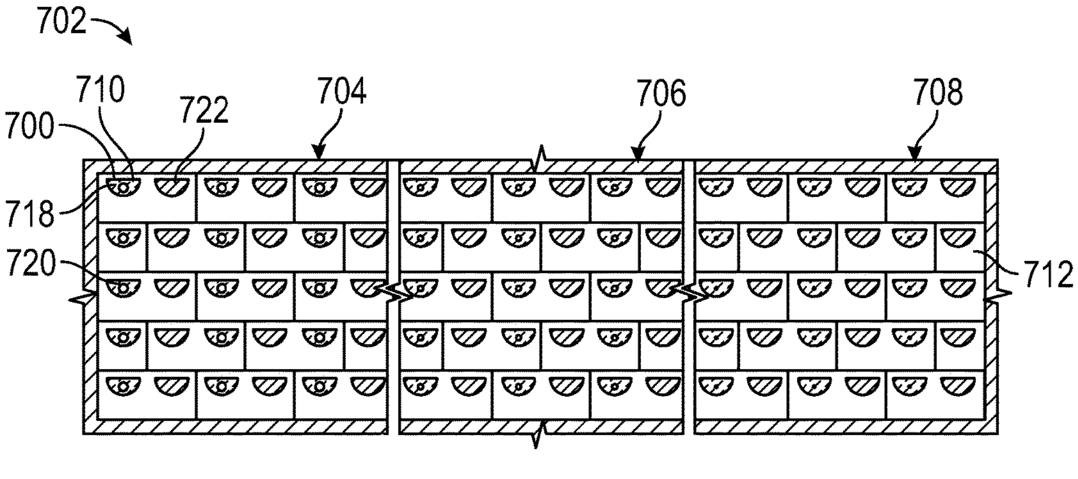
FIG. 15B is a side view of a portion of the ported tunnel wall of FIG. 15B having flow passage inserts and plugs according to some other embodiments of the present invention.

In the embodiments of FIGS. 15A-15B, correspondence of the last two digits in the reference numerals indicates like correspondence with the parts or components shown in FIG. 14. FIGS. 15A-15B show an arrangement of ports 700 in portions of the wall 702 at the near interval 708 adjacent an open (exit) end of the tunnel, an intermediate interval 706, and a far interval 704 adjacent a closed end of the tunnel. The ports 700 have a semicircular profile and there are two ports formed in each block 712, one in each half aligned horizontally such that in the constructed wall 702 the ports are arranged in rows corresponding to the rows of blocks 712 and columns corresponding to the overlapping halves of the stacked blocks 712.

As in FIG. 14, the ports 700 in FIG. 15A are of a uniform size or profile, inserts 716 have a plate 718 with a matching outside perimeter profile for receipt in the ports 700, and variably sized orifices 720 arranged in size such that the diameters increase from a smallest diameter in the near interval 708, to a larger diameter in intermediate interval 706, and to a largest diameter in interval 704. The inserts 716 can have a range of standard sizes for the orifices 720 as in Table 2. The intervals 704, 706, 708 can comprise a single column of ports 700, or multiple columns. Moreover, the sizes of the orifices in any interval or column can be different to adjust the overall flow conductivity and/or flue gas flow rate as desired, e.g., where orifices of all one standard size would provide too much or too little flow area, the orifice sizes can be mixed such as by selecting one or more larger or smaller orifice sizes to obtain the nearest approximation of the desired flow area, i.e., mixing and matching from the available orifice sizes. In general, it is desired to use orifice sizes in each interval that are not radically different in order to avoid introducing relatively more flue gas in some areas of the interval or column, e.g., using only 2 or 3 different orifice sizes that are all adjacent in the series of sizes, such as mixing 34.9 mm and 38.1 mm orifices in the same interval, rather than 28.6 mm and 38.1 mm orifices, for example. In some embodiments, each interval has no more than 3 different orifice sizes, or no more than 2 different orifice sizes, or only 1 orifice size.

FIG. 15B is similar to FIG. 15A except that alternate columns of the ports 700 are fitted with one or more plugs 722, which may be imperforate or undrilled versions of the inserts 716, where it may be desired to remove ports or otherwise adjust the layout pattern of the ports. In some embodiments, some of the plugs 722 are used to provide attachment points for tie rods.

Figure 15C:
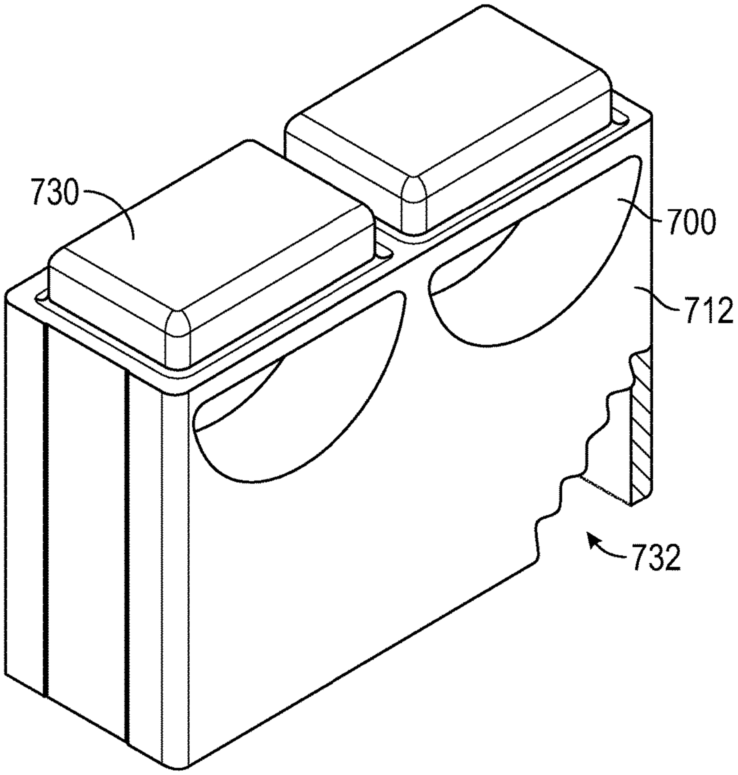
FIG. 15C is a perspective view of an interlocking block used in the tunnel walls of FIGS. 15A-15B.
Figure 15D:
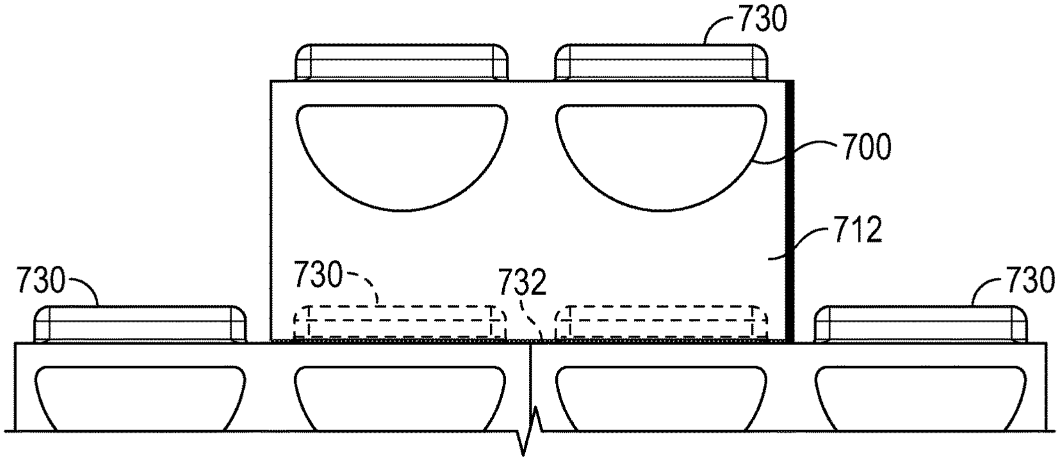
FIG. 15D is a side view of the stacked blocks of FIG. 15C.

FIGS. 15C-15D show an interlocking, stackable refractory block 712 with preformed ports 700 which can be used to construct the wall 702 in FIGS. 15A-15B. The block 712 can have tabs 730 on an upper surface which can be received in a corresponding recess 732 formed in a lower portion of the block 712 for overlapped stacking, e.g., tabs 730 from adjacent blocks can fit into respective sides of the same recess 732 of a block 712 stacked on top and overlapping the tabs of the adjacent blocks as best seen in FIG. 15D.

Figure 16A:
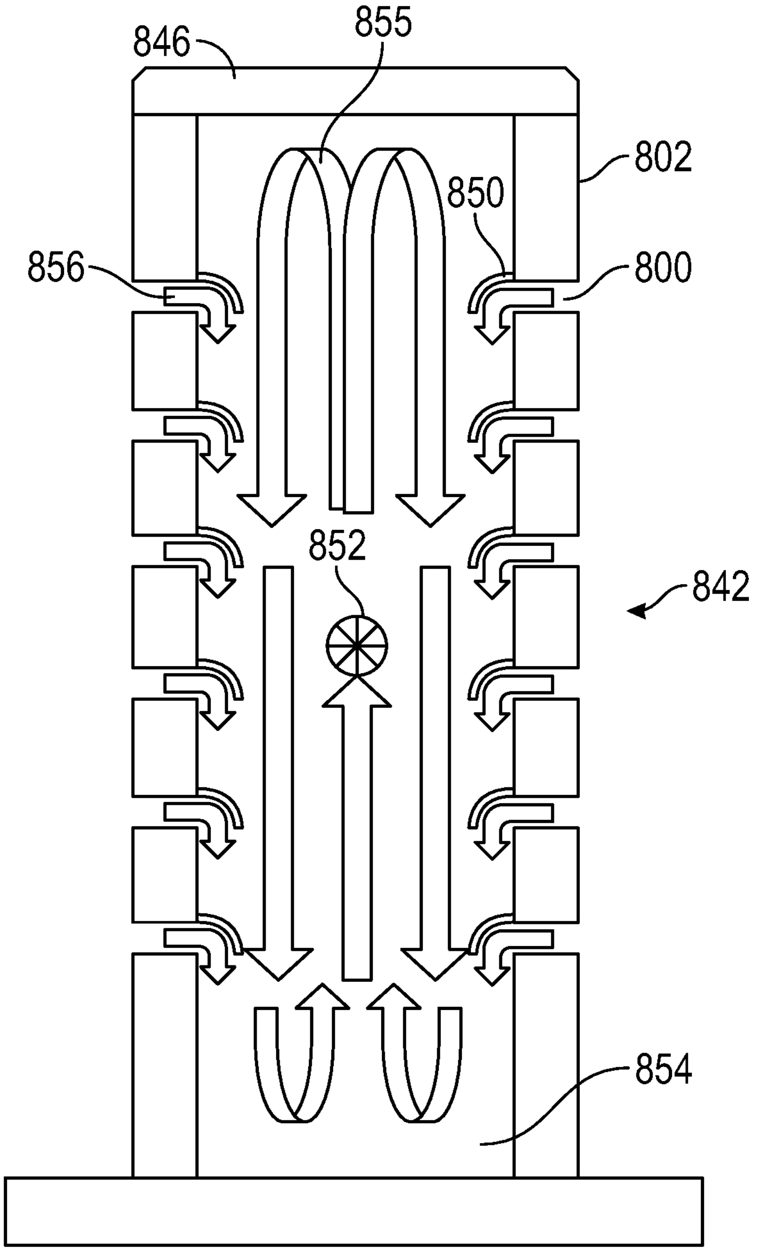
FIG. 16A is a schematic illustration of a tunnel flow pattern according to some embodiments of the present invention.

With reference to FIG. 16A, in some embodiments the ports 800 in the walls 802 may be fitted with directional flow diverters 850 to promote circulation within the tunnel 842, e.g., to facilitate mixing of the flue gas with a reducing agent such as ammonia or urea solution introduced into the tunnel 842 via spray nozzle 852, which may be located at the closed end 854 of the tunnel. The reducing agent facilitates lower NOx emissions using a selective non-catalytic reduction technique, and improved mixing achieved by the flow diverters 850 can increase mixing and thus increase residence time in the tunnel and efficiency of contact between the disassociated reducing agent and any NOx contained in the flue gas. The counterclockwise-clockwise mixed flow pattern 855 indicated in FIG. 16A develops when the diverters 850 direct the entering flue gas 856 down (or up) on either side, and thus up (or down) in the middle.

Figure 16B:
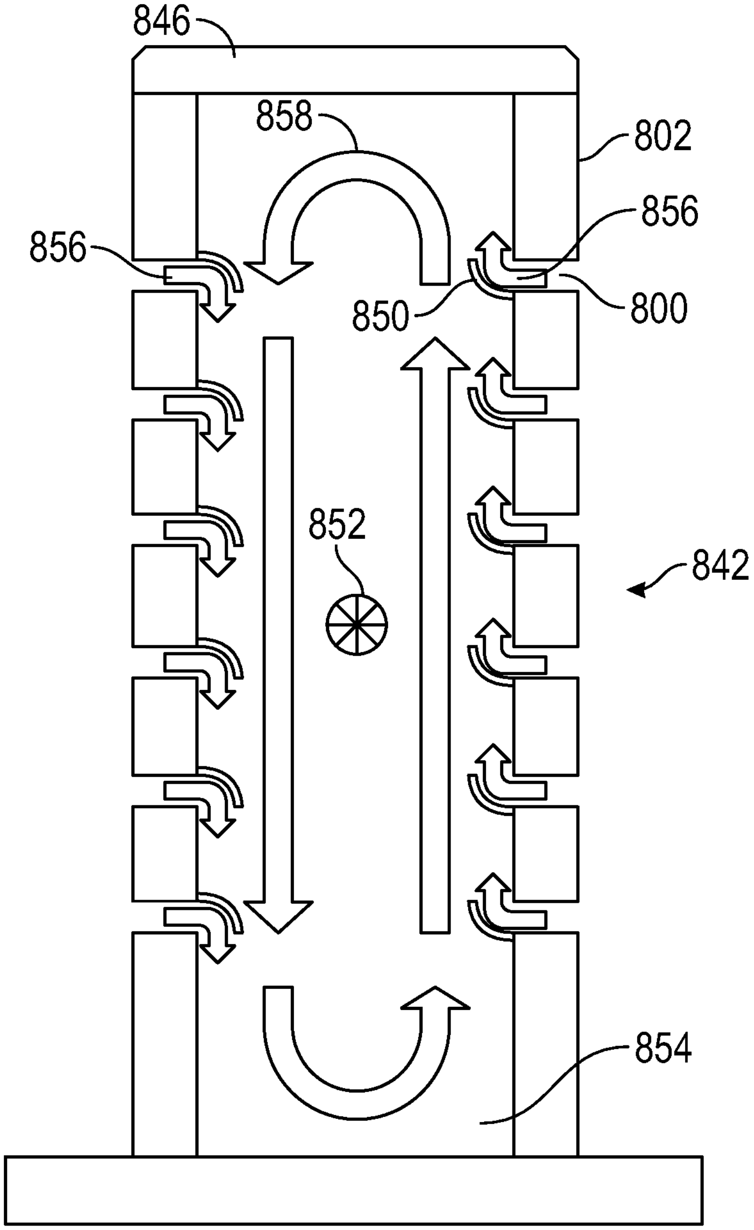
FIG. 16B is a schematic illustration of another tunnel flow pattern according to some embodiments of the present invention.

In the arrangement shown in FIG. 16B as another example, the flow diverters 850 are pointed with the diverters 850 on the left side directing the entering flue gas 856 down, and up on the right side, to effect a circular circulation pattern 858.

As a further alternative demonstrating another circulating effect by changing the direction of the diverters 850, e.g., they can be pointed horizontally or at an angle toward the closed end 854 to promote back mixing. A back-mixing entry configuration (not shown) of the flow diverters 850 may include accommodation for the effect of any velocity pressure or venturi translation into the pressure drop calculations for flue gas entry into the ports 800.

Figure 17:
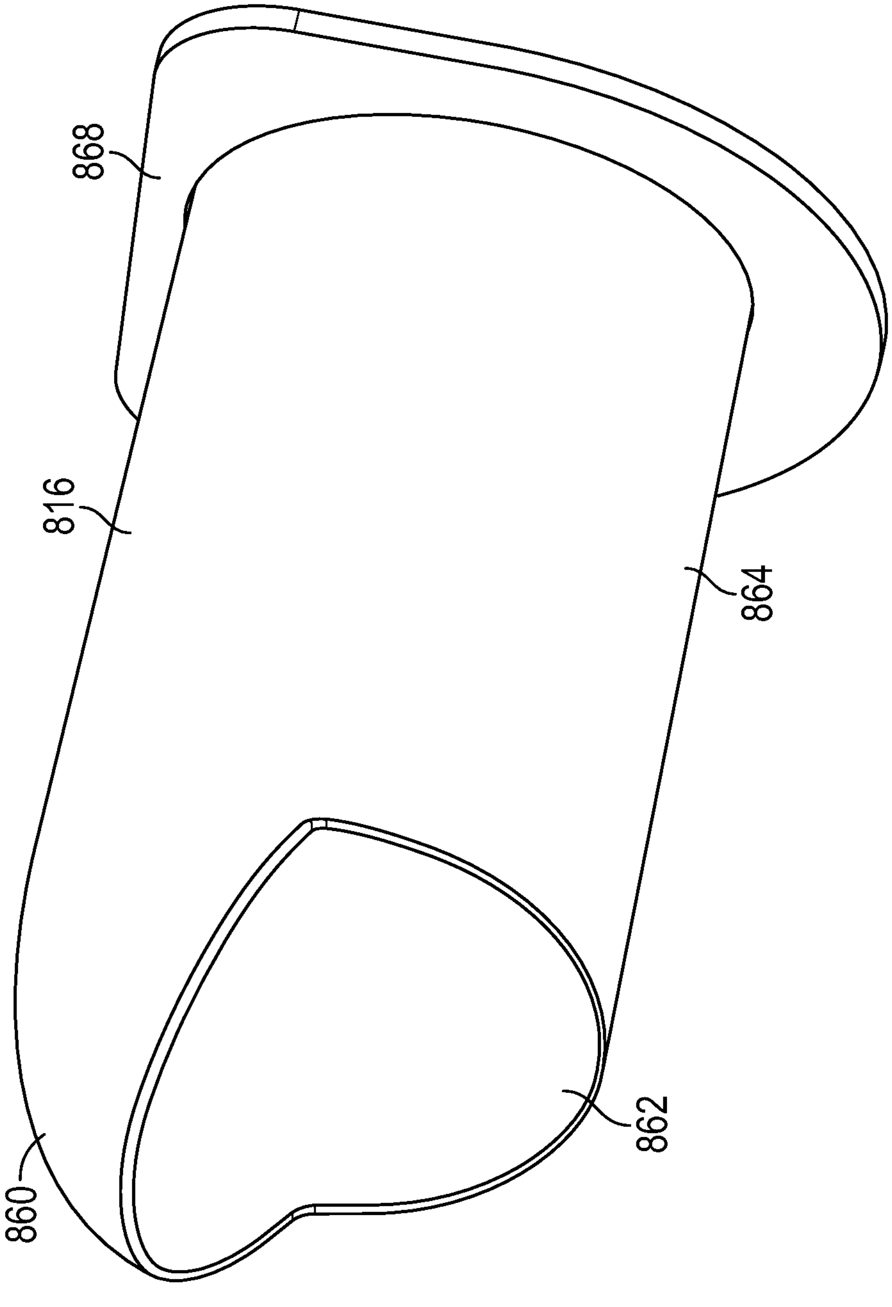
FIG. 17 is a perspective view of a directional flow diverter according to some embodiments of the present invention.

FIG. 17 shows an embodiment of a flow diverter 850 provided in the form of an insert 816 having a hemispherical diverter portion 860 formed with an opening 862 at the end of a sleeve 864 on the outlet side. An enlarged sleeve portion 866 provides annular surface 868 to abut against a lip in the port, and can help locate and stabilize the insert 816 in the port, e.g., where the port has a profile such as an inside diameter matching that of the outside diameter or other profile of the enlarged sleeve portion 866. If desired, all or selected ones of the insert 816 can also be provided with an orifice to control the flue gas entry into the tunnel 842, as in any of FIGS. 10-15C. The flow diverter 850 can be made from a heat-resistant material such as a refractory ceramic, for example, alumina, mullite, or a combination thereof, and can be secured in the ports 300 by means of a matching and optionally interlocking profile and/or with refractory mortar or cement.

EMBODIMENTS LISTING

In some aspects, the disclosure herein relates generally to furnace flue gas tunnels and related methods according to the following Embodiments, among others:

Embodiment 1

A furnace tunnel defining a flow channel for flue gas from a firebox to pass to an open end of the tunnel, comprising:

a longitudinal refractory structure separating the flow channel from the firebox;

a plurality of ports formed in the refractory structure for the flue gas to enter the flow channel from the firebox;

a regular spacing pattern of the ports along the length of the refractory structure; and a passage through each of the respective ports providing relatively varied flow conductivities to control flue gas entry into the flow channel.

Embodiment 2

The furnace tunnel of Embodiment 1 wherein the refractory structure comprises at least one upright wall and a roof.

Embodiment 3

The furnace tunnel of Embodiment 1 or Embodiment 2 wherein the refractory structure comprises at least one upright wall comprising the ports and an essentially imperforate roof.

Embodiment 4 The furnace tunnel of any one of Embodiments 1-3 wherein the refractory structure comprises interlocking blocks.

Embodiment 5

The furnace tunnel of any one of Embodiments 1-4 wherein the refractory structure comprises blocks, wherein the ports are integrally formed in the blocks, and wherein perforated inserts are received in the ports, wherein the perforations define cross-sectional flow areas through the respective passages.

Embodiment 6

The furnace tunnel of any one of Embodiments 1-5 wherein the ports have a uniform profile and receive perforated inserts having a matching profile, and wherein the perforations in some of the inserts have a cross-sectional flow area that is greater with respect to the perforations of some of the other inserts.

Embodiment 7

The furnace tunnel of any one of Embodiments 1-6 wherein the ports have a uniform profile and receive perforated inserts having a matching profile, wherein the perforated inserts comprise sets of a plurality of the inserts, wherein the perforations within each set of inserts have a uniform cross-sectional flow area that differs with respect to the other one or more sets of inserts.

Embodiment 8

The furnace tunnel of any one of Embodiments 1-7 wherein the ports are disposed in a plurality of intervals comprising a near interval adjacent to the open end, a far interval spaced away from the open end, and a plurality of intermediate intervals between the near and far intervals, wherein the passages through the ports provide the far interval with an overall flue gas flow conductivity relatively greater than the overall flue gas flow conductivity of the near interval, and wherein the overall flue gas flow conductivities of the respective intermediate intervals increase successively from the near interval to the far interval.

Embodiment 9

The furnace tunnel of any one of Embodiments 1-8 wherein the ports are disposed in a plurality of intervals comprising a near interval adjacent to the open end, a far interval spaced away from the open end, and a plurality of intermediate intervals between the near and far intervals, wherein the passages through the ports provide the far interval with an overall cross sectional flow area greater than the overall cross sectional flow area of the near interval, and wherein the overall cross sectional flow area of the respective intermediate intervals increase successively from the near interval to the far interval.

Embodiment 10

The furnace tunnel of any one of Embodiments 1-9, wherein:

the ports are disposed in a plurality of intervals comprising a near interval adjacent to the open end, a far interval spaced away from the open end, and a plurality of intermediate intervals between the near and far intervals;

each of the near, far and intermediate intervals have the same number of ports;

the ports have a uniform profile and receive perforated inserts having a matching profile;

wherein the perforated inserts comprise one or more sets of the inserts having a uniform perforation diameter;

wherein the far interval has an overall cross sectional flow area greater than the overall cross sectional flow area of the near interval, and the overall cross sectional flow area of the respective intermediate intervals increase successively from the near interval to the far interval.

Embodiment 11

The furnace tunnel of any one of Embodiments 1-10 wherein the inserts in each interval comprise inserts from a single set of inserts or from a plurality of different sets.

Embodiment 12

A furnace comprising a firebox and the furnace tunnel of any one of Embodiments 1-11.

Embodiment 13

A furnace tunnel assembly system comprising:

a plurality of interlocking refractory blocks adapted to form a longitudinal wall of a flue gas flow channel in a firebox;

at least some of the blocks comprising ports formed for the flue gas to enter the flow channel from the firebox;

respective flow passages for the ports, wherein at least some of the ports comprise passages having a relatively different flow conductivity than at least some of the other passages.

Embodiment 14

The furnace tunnel assembly system of Embodiment 13 wherein the flow passages comprise bores through the blocks and the different flow conductivities correspond to different diameters of the bores.

Embodiment 15

The furnace tunnel assembly system of Embodiment 13 or Embodiment 14 wherein the flow passages comprise orifices formed in respective inserts receivable in the ports, wherein the different flow conductivities correspond to different diameters of the orifices.

Embodiment 16

The furnace tunnel assembly system of and one of Embodiments 13-15, further comprising a plurality of sets of the inserts, wherein the inserts within each set have respective orifices of the same size, and wherein each set has different orifice sizes than the other sets.

Embodiment 17

A method comprising assembling a furnace tunnel from the blocks and or inserts of the furnace tunnel assembly system of any one of Embodiments 13 to 16.

Embodiment 18

A method comprising:

stacking refractory blocks to form a longitudinal wall of a furnace tunnel;

providing a uniform density of ports in successive intervals in the wall between open and closed ends of the tunnel; and providing flow passages of varying relative flow conductivity through the ports.

Embodiment 19

The method of Embodiment 18 further comprising placing perforated inserts in the ports, wherein the flow passages comprise one or more orifices formed in respective inserts receivable in the ports, wherein the different flow conductivities correspond to different diameters of the orifices.

Embodiment 20

The method of Embodiment 18 or Embodiment 19 further comprising varying cross-sectional areas of the passages to regulate entry of flue gas from a firebox into the tunnel such that a mass flow of the flue gas from the firebox is uniformly distributed through each interval.

Embodiment 21

A method comprising:

passing flue gas from a firebox through a longitudinal refractory structure of a tunnel;

positioning passages in respective ports evenly distributed along the length of the refractory structure to admit the flue gas into a flow channel in the tunnel; and controlling relative flow rates of the flue gas through the ports by providing some of the passages with a different flow conductivity relative to the other passages.

Embodiment 22

The method of Embodiment 21, further comprising dividing the length of the refractory structure into a plurality of regular intervals having the same number of ports, wherein the overall flow conductivity of some of the intervals is different relative to the other intervals.

Embodiment 23

The method of Embodiment 21 or Embodiment 22 further comprising dividing the length of the refractory structure into a plurality of regular intervals having the same number of ports, wherein the overall flow conductivity of successive intervals increases from a near interval adjacent to an open end of the tunnel to a far interval adjacent a closed end of the tunnel.

Embodiment 24

The method of any one of Embodiments 21-23, further comprising dividing the length of the refractory structure into a plurality of regular intervals having the same number of ports, and evenly distributing a mass flow rate of the flue gas entering the tunnel among the intervals such that the mass flow rate of the flue gas through each interval is no more than 2% greater or less than an overall average of the mass flow rate through the intervals.

Embodiment 25

The method of any one of Embodiments 21-24, further comprising placing inserts in respective ports, the inserts comprising the respective passages.

Embodiment 26

The method of any one of Embodiments 21-25 wherein the inserts and ports have matching profiles.

Embodiment 27

The method of any one of Embodiments 21-26, wherein the inserts comprise sets of perforated inserts, wherein the perforations within each set of inserts have a uniform cross-sectional flow area that differs with respect to the other one or more sets of inserts.

Embodiment 28

The method of any one of Embodiments 21-27, further comprising dividing the length of the refractory structure into a plurality of regular intervals having the same number of ports, wherein the intervals comprise a near interval adjacent to an open end of the tunnel, a far interval spaced away from the open end, and a plurality of intermediate intervals between the near and far intervals, wherein the perforations in the inserts provide the far interval with an overall cross sectional flow area relatively greater than the overall cross sectional flow area of the near interval, and wherein the overall cross sectional flow area of the respective intermediate intervals increase successively from the near interval to the far interval.

Embodiment 29

The method of any one of Embodiments 21-28, wherein the inserts in each interval comprise inserts from a single set of inserts or from a plurality of different sets.

Embodiment 30

A flue gas tunnel comprising:

a longitudinal wall extending along a flow channel from a closed end of the tunnel to an open end of the tunnel;

a plurality of ports of uniform profile formed in the wall for the flue gas to enter the flow channel and arranged in columns from a near column adjacent the open end to a far column adjacent the closed end and a plurality of intermediate columns between the near and far columns, wherein each of the columns has the same number of ports;

a like plurality of inserts having a profile matching the respective ports and received therein;

orifices formed in the respective inserts;

a plurality of sets of the inserts, each set having a different orifice diameter with respect to the other sets, each set of inserts comprising orifices of uniform diameter within the set;

wherein each column comprises a plurality of inserts selected from one or more of the sets of inserts, such that an overall cross-sectional flow area through the orifices of each column increases from the near column to the far column.

Embodiment 31

The flue gas tunnel of Embodiment 30, wherein the wall comprises interlocking blocks.

Embodiment 32

The flue gas tunnel of Embodiment 30 or Embodiment 31, wherein the ports are arranged in regular rows and columns.

Embodiment 33

The flue gas tunnel of any one of Embodiments 30-32, wherein the ports are arranged in a triangular pattern or a square pattern.

Embodiment 34

The flue gas tunnel of any one of Embodiments 30-33, further comprising single ones of the inserts having a different orifice diameter than the sets of the inserts in the ports of one or more of the columns.

Embodiment 35

The furnace tunnel of any one of Embodiments 1-11, further comprising one or more directional flow diverters fitted in the ports to promote flue gas circulation in the tunnel.

Embodiment 36

The furnace tunnel assembly system of any one of Embodiments 13-16, further comprising one or more directional flow diverters for the ports to promote flue gas circulation in the tunnel.

Embodiment 37

The flue gas tunnel of any one of Embodiments 30-34, further comprising one or more directional flow diverters fitted in the ports to promote flue gas circulation in the tunnel.

Embodiment 38

A furnace tunnel defining a flow channel for flue gas from a firebox to pass to an open end of the tunnel, comprising:

a longitudinal refractory structure separating the flow channel from the firebox;

ports formed in the refractory structure for the flue gas to enter the flow channel from the firebox; and directional flow diverters fitted in the ports to promote flue gas circulation in the tunnel.

Embodiment 39

The furnace tunnel of Embodiment 38, further comprising a spray nozzle to introduce a reducing agent.

Embodiment 40

The furnace tunnel of Embodiment 39, wherein the reducing agent comprises ammonia or urea solution.

Embodiment 41

The furnace tunnel of Embodiment 38 or Embodiment 39, wherein the spray nozzle is located at a closed end of the tunnel.

Embodiment 42

The furnace tunnel of any one of Embodiments 38-41, wherein the flow diverters comprise inserts in the ports having a diverter on an outlet end.

Embodiment 43

The furnace tunnel of Embodiment 42, wherein the diverter is hemispherical.

Embodiment 44

The furnace tunnel of Embodiment 42 or Embodiment 43, wherein the inserts have a profile matching a profile of the ports.

Embodiment 45

The furnace tunnel of any one of Embodiments 42-44, wherein the inserts are provided with orifices to control flue gas entry into the tunnel.

Embodiment 46

The furnace tunnel of any one of Embodiments 42-45, wherein the inserts comprise a refractory material.

Embodiment 47

The furnace tunnel of any one of Embodiments 38-46, wherein the refractory structure comprises first and second opposing walls on either side of the flow channel.

Embodiment 48

The furnace tunnel of Embodiment 47, wherein the flow diverters direct the flow down on the first wall and up on the second wall to effect a circular circulation pattern.

Embodiment 49

The furnace tunnel of Embodiment 47, wherein the flow diverters direct the flow on both of the first wall and the second wall in the same direction up or down to effect a counterclockwise-clockwise mixed flow pattern.

Embodiment 50

The furnace tunnel of Embodiment 47, wherein the flow diverters are pointed horizontally or at an angle toward a closed end of the tunnel.

Embodiment 51

A furnace tunnel defining a flow channel for flue gas from a firebox to pass to an open end of the tunnel, comprising:

a longitudinal refractory structure separating the flow channel from the firebox;

ports formed in the refractory structure for the flue gas to enter the flow channel from the firebox;

directional flow diverters comprising inserts fitted in the ports having a diverter on an outlet end to promote circular, counterclockwise-clockwise, or backmixing flue gas circulation in the tunnel;

orifices provided in the inserts to control flue gas entry into the tunnel;

a spray nozzle located at a closed end of the tunnel to introduce a reducing agent.

Embodiment 52

The furnace tunnel of any one of Embodiments 38-51, further comprising a passage through each of the respective ports providing relatively varied flow conductivities to control flue gas entry into the flow channel.

Embodiment 53

A method, comprising:

passing flue gas from a firebox through a longitudinal refractory structure of a tunnel;

positioning passages in respective ports evenly distributed along the length of the refractory structure to admit the flue gas into a flow channel in the tunnel; and fitting directional flow diverters in the ports to promote flue gas circulation in the tunnel.

Embodiment 54

The method of Embodiment 53 or Embodiment 62, further comprising introducing a reducing agent into the tunnel to lower NOx emissions.

Embodiment 55

The method of Embodiment 54, wherein the reducing agent comprises ammonia or urea solution.

Embodiment 56

The method of Embodiment 54 or Embodiment 55, comprising introducing the reducing agent at a closed end of the tunnel.

Embodiment 57

The method of any one of Embodiments 53-56 or 62, comprising providing orifices in the directional flow diverters to control flue gas entry into the tunnel.

Embodiment 58 method of any one of Embodiments 53-57 or 62, wherein the directional flow diverters effect a circular circulation pattern in the tunnel.

Embodiment 59

The method of any one of Embodiments 53-57 or 62, wherein the directional flow diverters effect a counterclockwise-clockwise mixed flow pattern.

Embodiment 60

The method of any one of Embodiments 53-57 or 62, wherein the directional flow diverters promote back mixing in the tunnel.

Embodiment 61

The method of any one of Embodiments 53-60, further comprising controlling relative flow rates of the flue gas through the ports by providing some of the passages with a different flow conductivity relative to the other passages.

Embodiment 62

The method of any one of Embodiments 21-29, further comprising fitting directional flow diverters in the ports to promote flue gas circulation in the tunnel.

EXAMPLE

Figure 18A:
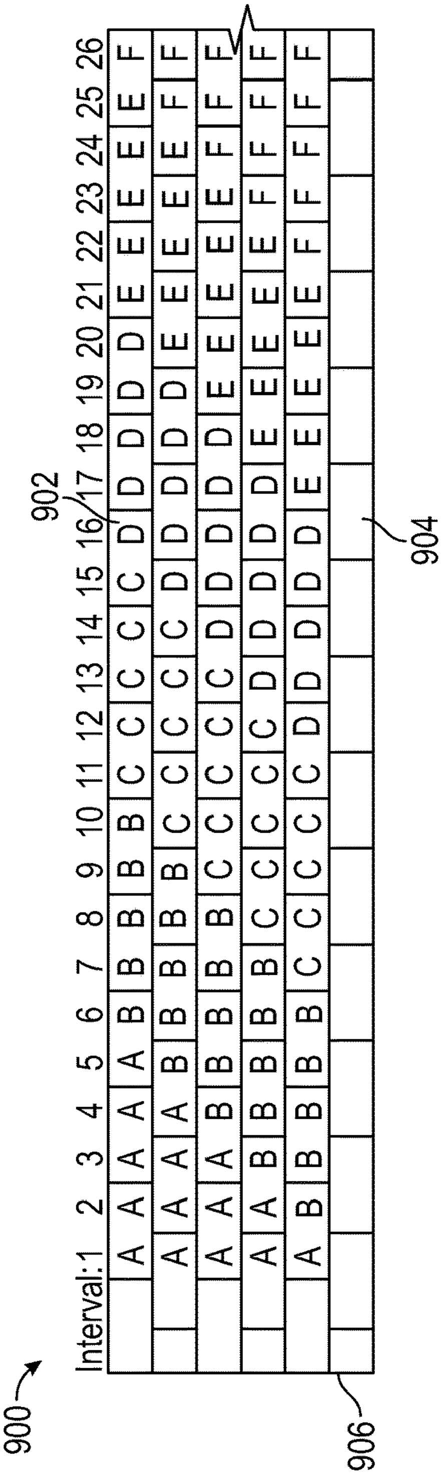
FIG. 18A is a schematic diagram showing an example of the orifice layout in intervals 1-26 from the closed end (left) of a tunnel design according to some embodiments of the present invention.
Figure 18B:
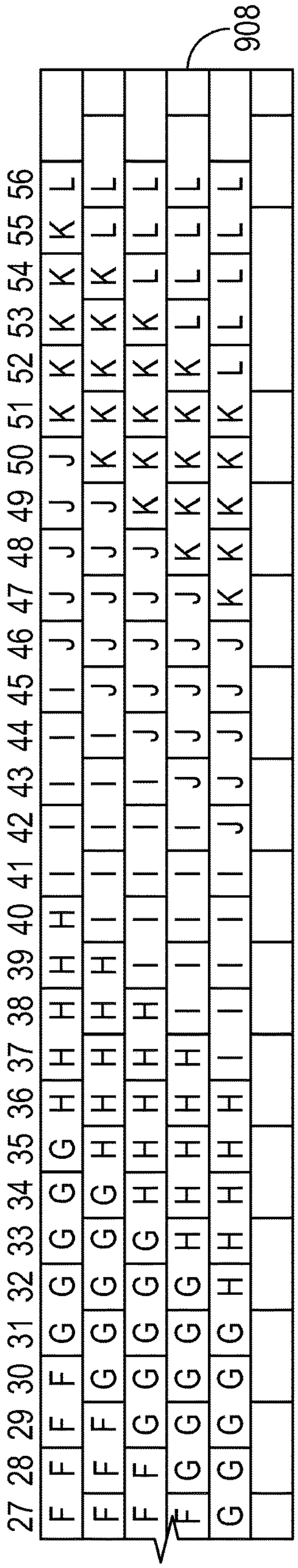
FIG. 18B is a schematic diagram showing the orifice layout in intervals 27-56 approaching the open end (right) of the tunnel design of FIG. 18A according to some embodiments of the present invention.

FIGS. 18A-18B show an example of a design for an interior tunnel wall 900 of a steam-methane reformer according to the present invention, using the orifice sizes of Table 3 for inserts in 22.86 cm (9") by 45.72 cm (18") blocks with 2 inserted orifices in each block. In this example, the tunnel is 29 m long and 3.05 m high, using 5 rows of blocks 902 with inserts over 1 row of solid blocks 904 on the floor of the furnace. The tunnel wall 900 is 30 blocks long including 56 1-column intervals of inserted orifices at 2 per length of the block 902, and 1 solid block (2 columns of overlapping half-blocks) at either end. The intervals 1 to 26 numbering from the closed end of the tunnel are shown in FIG. 18A, and intervals 27 to 56 approaching the open end in FIG. 18B. The inserts in the blocks 902 are designated A through L in FIGS. 18A-18B according to decreasing size as shown in Table 3.

TABLE 3

Standard Orifice Sizes for Inserts in Example of FIGS. 18A-18B

| Letter designation | Orifice size, mm (in.) |
|---|---|
| A | 69.8 (2.75) |
| B | 63.5 (2.5) |
| C | 57.2 (2.25) |
| D | 50.8 (2) |
| E | 57.6 (1.875) |
| F | 44.4 (1.75) |
| G | 41.3 (1.625) |
| H | 38.1 (1.5) |
| I | 34.9 (1.375) |
| J | 31.8 (1.25) |
| K | 28.6 (1.125) |
| L | 25.4 (1) |

TABLE 4

Interval Configuration in Example of FIG. 18A-18B

| Interval (1-28) | Orifices used | Total flow area, $cm^2$ ($in.^2$) | Interval (29-56) | Orifices used | Total flow area, $cm^2$ ($in.^2$) |
|---|---|---|---|---|---|
| 1 | 10 A | 383 (59.4) | 29 | 4 F; 6 G | 142 (22.06) |
| 2 | 8 A; 2 B | 368 (57.33) | 30 | 2 F; 8 G | 137 (21.4) |
| 3 | 6 A; 4 B | 355 (55.27) | 31 | 10 G | 133 (20.74) |
| 4 | 4 A; 6 B | 341 (53.21) | 32 | 8 G; 2 H | 129 (20.13) |
| 5 | 2 A; 8 B | 328 (51.15) | 33 | 6 G; 4 H | 125 (19.51) |
| 6 | 10 B | 315 (49.09) | 34 | 4 G; 6 H | 121 (18.9) |
| 7 | 8 B; 2 C | 303 (47.22) | 35 | 2 G; 8 H | 117 (18.29) |
| 8 | 6 B; 4 C | 291 (45.36) | 36 | 10 H | 113 (17.67) |
| 9 | 4 B; 6 C | 279 (43.49) | 37 | 8 H;2 I | 110 (17.11) |
| 10 | 2 B; 8 C | 267 (41.63) | 38 | 6 H; 4 I | 106 (16.54) |
| 11 | 10 C | 255 (39.76) | 39 | 4 H; 6 I | 103 (15.98) |
| 12 | 8 C; 2 D | 244 (38.09) | 40 | 2 H; 8 I | 98.9 (15.41) |
| 13 | 6 C; 4 D | 234 (36.42) | 41 | 10 I | 95.3 (14.85) |
| 14 | 4 C; 6 D | 223 (34.75) | 42 | 8 I; 2 J | 91.9 (14.33) |
| 15 | 2 C; 8 D | 212 (33.08) | 43 | 6 I; 4 J | 88.7 (13.82) |
| 16 | 10 D | 202 (31.42) | 44 | 4 I; 6 J | 85.3 (13.3) |
| 17 | 8 D; 2 E | 197 (30.66) | 45 | 2 I; 8 J | 82.1 (12.79) |
| 18 | 6 D; 4 E | 192 (29.89) | 46 | 10 J | 78.7 (12.27) |
| 19 | 4 D; 6 E | 187 (29.13) | 47 | 8 J; 2 K | 75.8 (11.81) |
| 20 | 2 D; 8 E | 182 (28.37) | 48 | 6 J; 4 K | 72.8 (11.34) |
| 21 | 10 E | 177 (27.61) | 49 | 4 J; 6 K | 69.7 (10.87) |
| 22 | 8 E; 2 F | 173 (26.9) | 50 | 2 J; 8 K | 66.8 (10.41) |
| 23 | 6 E; 4 F | 168 (26.19) | 51 | 10 K | 63.8 (9.94) |
| 24 | 4 E; 6 F | 163 (25.48) | 52 | 8 K; 2 L | 61.1 (9.52) |
| 25 | 2 E; 8 F | 159 (24.76) | 53 | 6 K; 4 L | 58.4 (9.11) |
| 26 | 10 F | 154 (24.05) | 54 | 4 K; 6 L | 55.8 (8.69) |
| 27 | 8 F; 2 G | 150 (23.39) | 55 | 2 K; 8 L | 64.9 (8.27) |
| 28 | 6 F; 4 G | 146 (22.73) | 56 | 10 L | 50.6 (7.85) |

The intervals are labeled 1 to 56 at the top of the wall 900, where interval 1 is near the closed end 906 and interval 56 is near the open end 908. The size of the orifices used in each block is indicated schematically in FIG. 18 by the letter A to L according to Table 3. The number of orifices of each size used in each interval (both walls) and the total flow area of each interval (both walls) is given in Table 4.

In this example, the overall flue gas flow conductivity of each interval is adjusted by adjusting the cross-sectional flow area using orifices from 1 or 2 sets of the available orifice sizes in each column, e.g., interval 1 uses 10 (5 in each wall of the interior tunnel) of the inserts with the "A" orifices, interval 2 uses 8 A's and 2 B's, and so on. The smaller orifices in each interval are placed ascending in the lower rows to direct less of the flue gas to the lower rows, corresponding to the temperature-sensitive lower ends of the reactor tubes.

Although only a few exemplary embodiments have been described in detail above, those skilled in the art will readily appreciate that many modifications are possible in the example embodiments without materially departing from this disclosure. For example, any embodiments specifically described may be used in any combination or permutation with any other specific embodiments described herein. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' or 'step for' together with an associated function without the recitation of structure.

What is claimed is:

1. A furnace tunnel defining a flow channel for flue gas from a firebox to pass to an open end of the furnace tunnel, comprising:

a longitudinal refractory structure separating the flow channel from the firebox, wherein the refractory structure comprises blocks;

a plurality of ports formed in the refractory structure for the flue gas to enter the flow channel from the firebox, wherein the ports are integrally formed in the blocks;

a regular spacing pattern of the ports along the length of the refractory structure; and passages through the respective ports providing relatively varied flow conductivities to control flue gas entry into the flow channel, wherein perforated inserts are received in the ports, and wherein perforations in the perforated inserts define cross-sectional flow areas through the respective passages that are less than a cross-sectional area of the respective ports.

2. The furnace tunnel of claim 1 wherein the refractory structure comprises at least one upright wall and a roof.

3. The furnace tunnel of claim 1 wherein the refractory structure comprises at least one upright wall comprising the ports and an essentially imperforate roof.

4. The furnace tunnel of claim 1 wherein the refractory structure comprises interlocking blocks.

5. The furnace tunnel of claim 1 wherein the ports have a uniform profile and the perforated inserts have a matching profile, and wherein the perforations in some of the inserts have a cross-sectional flow area that is greater with respect to the perforations of some of the other inserts.

6. The furnace tunnel of claim 1 wherein the ports have a uniform profile and the perforated inserts have a matching profile, wherein the perforated inserts comprise sets of a plurality of the inserts, wherein the perforations within each set of inserts have a uniform cross-sectional flow area that differs with respect to the other one or more sets of inserts.

7. The furnace tunnel of claim 1 wherein the ports are disposed in a plurality of intervals comprising a near interval adjacent to the open end, a far interval spaced away from the open end, and a plurality of intermediate intervals between the near and far intervals, wherein the passages through the ports provide the far interval with an overall flue gas flow conductivity relatively greater than the overall flue gas flow conductivity of the near interval, and wherein the overall flue gas flow conductivities of the respective near, intermediate, and far intervals increase successively from the near interval to the far interval.

8. The furnace tunnel of claim 1 wherein the ports are disposed in a plurality of intervals comprising a near interval adjacent to the open end, a far interval spaced away from the open end, and a plurality of intermediate intervals between the near and far intervals, wherein the passages through the ports provide the far interval with an overall cross sectional flow area greater than the overall cross sectional flow area of the near interval, and wherein the overall cross sectional flow areas of the respective near, intermediate, and far intervals increase successively from the near interval to the far interval.

9. The furnace tunnel of claim 1, wherein:

the ports are disposed in a plurality of intervals comprising a near interval adjacent to the open end, a far interval spaced away from the open end, and a plurality of intermediate intervals between the near and far intervals;

each of the near, far and intermediate intervals have the same number of ports;

the ports have a uniform profile and the perforated inserts have a matching profile;

wherein the perforated inserts comprise one or more sets of the inserts having a uniform perforation diameter;

wherein the far interval has an overall cross sectional flow area greater than the overall cross sectional flow area of the near interval, and the overall cross sectional flow areas of the respective near, intermediate, and far intervals increase successively from the near interval to the far interval.

10. The furnace tunnel of claim 9 wherein the inserts in each interval comprise inserts from a single set of inserts or from a plurality of different sets.

11. A furnace comprising a firebox and the furnace tunnel of claim 1.

12. The furnace tunnel of claim 1, further comprising directional flow diverters fitted in one or more of the ports to promote flue gas circulation in the flow channel.

13. The furnace tunnel of claim 1, further comprising plugs in some of the ports.

14. The furnace tunnel of claim 13, wherein the ports, inserts, and plugs have matching profiles.

15. A furnace tunnel assembly system comprising:

a plurality of interlocking refractory blocks adapted to form a longitudinal wall of a flue gas flow channel in a firebox;

at least some of the blocks comprising ports formed for flue gas to enter the flow channel from the firebox;

respective flow passages for the ports, wherein at least some of the ports comprise passages having relatively different flow conductivities than at least some of the other passages, wherein the flow passages comprise orifices formed in respective inserts receivable in the ports, wherein the orifices define cross-sectional flow areas through the respective passages that are less than that of the respective ports, wherein the different flow conductivities correspond to different diameters of the orifices.

16. The furnace tunnel assembly system of claim 15, further comprising a plurality of sets of the inserts, wherein the inserts within each set have respective orifices of the same size, and wherein each set has a different orifice size than the other sets.

17. The furnace tunnel assembly system of claim 15, further comprising directional flow diverters fitted in one or more of the ports to promote flue gas circulation in the flow channel.

18. A method comprising:

stacking refractory blocks to form a longitudinal wall of a furnace tunnel;

providing a uniform density of ports in successive intervals in the wall between open and closed ends of the tunnel; and placing perforated inserts in one or more of the ports, wherein one or more orifices are formed in the perforated inserts placed in the ports, wherein the orifices define cross-sectional flow areas through the respective passages that are less than that of the respective ports, and wherein the different flow conductivities through the ports correspond to different diameters of the orifices to provide flow passages of varying relative flow conductivities through the ports.

19. The method of claim 18, further comprising varying cross-sectional areas of the passages to regulate entry of flue gas from a firebox into the tunnel such that a mass flow of the flue gas from the firebox is uniformly distributed through each interval.

20. The method of claim 18, further comprising fitting directional flow diverters in one or more of the ports to promote flue gas circulation in the furnace tunnel.

21. A method comprising:

passing flue gas from a firebox through a longitudinal refractory structure of a tunnel;

positioning passages in respective ports evenly distributed along the length of the refractory structure to admit the flue gas into a flow channel in the tunnel; and controlling relative flow rates of the flue gas through the ports by providing some of the passages with different flow conductivities relative to the other passages by placing perforated inserts in one or more of the ports, wherein one or more orifices are formed in the perforated inserts placed in the ports, wherein the orifices define cross-sectional flow areas through the respective passages that are less than that of the respective ports, that are less than a cross-sectional area of the respective ports, and wherein the different flow conductivities through the ports correspond to different diameters of the orifices to provide flow passages of varying relative flow conductivities through the ports.

22. The method of claim 21, further comprising dividing the length of the refractory structure into a plurality of regular intervals having the same number of ports, wherein the overall flow conductivities of some of the intervals are different relative to the other intervals.

23. The method of claim 21 further comprising dividing the length of the refractory structure into a plurality of regular intervals having the same number of ports, wherein the overall flow conductivities of successive intervals increase from a near interval adjacent to an open end of the tunnel to a far interval adjacent a closed end of the tunnel.

24. The method of claim 21, further comprising dividing the length of the refractory structure into a plurality of regular intervals having the same number of ports, and evenly distributing a mass flow rate of the flue gas entering the tunnel among the intervals such that the mass flow rate of the flue gas through each interval is no more than 2% greater or less than an overall average of the mass flow rate through the intervals.

25. The method of claim 21, further comprising placing plugs in some of the ports.

26. The method of claim 21 wherein the inserts and ports have matching profiles.

27. The method of claim 21, wherein the inserts comprise sets of the perforated inserts, wherein the perforations within each set of inserts have a uniform cross-sectional flow area that differs with respect to the other one or more sets of inserts.

28. The method of claim 27, further comprising dividing the length of the refractory structure into a plurality of regular intervals having the same number of ports, wherein the intervals comprise a near interval adjacent to an open end of the tunnel, a far interval spaced away from the open end, and a plurality of intermediate intervals between the near and far intervals, wherein the perforations in the inserts provide the far interval with an overall cross sectional flow area relatively greater than the overall cross sectional flow area of the near interval, and wherein the overall cross sectional flow area of the respective intermediate intervals increase successively from the near interval to the far interval.

29. The method of claim 28, wherein the inserts in each interval comprise inserts from a single set of inserts or from a plurality of different sets.

30. The method of claim 21, further comprising fitting plugs in one or more of the ports.

31. The method of claim 21, further comprising fitting directional flow diverters in one or more of the ports to promote flue gas circulation in the flow channel.

32. The method of claim 25 wherein the ports, inserts, and plugs have matching profiles.

* * * * *